United States Patent [19]
Flik et al.

[11] Patent Number: 5,730,368
[45] Date of Patent: Mar. 24, 1998

[54] NOZZLE PLATE, PARTICULARLY FOR INJECTION VALVES AND PROCESSES FOR MANUFACTURING A NOZZLE PLATE

[75] Inventors: Gottfried Flik, Leonberg; Guenter Dantes, Eberdingen; Gilbert Moersch; Detlef Nowak, both of Stuttgart; Jörg Heyse, Markgröningen, all of Germany

[73] Assignee: Robert Bosch GmbH, Stuttgart, Germany

[21] Appl. No.: 652,452

[22] PCT Filed: Apr. 13, 1995

[86] PCT No.: PCT/DE95/00523

§ 371 Date: Oct. 30, 1996

§ 102(e) Date: Oct. 30, 1996

[87] PCT Pub. No.: WO96/10694

PCT Pub. Date: Apr. 11, 1996

[30] Foreign Application Priority Data

Sep. 30, 1994 [DE] Germany ............ 44 35 163.1

[51] Int. Cl.$^6$ ............... B05B 1/30; F02M 51/00
[52] U.S. Cl. ............ 239/575; 239/585.1; 239/585.4; 239/900
[58] Field of Search ............ 239/575, 585.1, 239/585.4, 596, 600

[56] References Cited

U.S. PATENT DOCUMENTS 4,057,190  11/1977  Kiwior et al. ............ 239/558

FOREIGN PATENT DOCUMENTS 27 23 280   12/1977  Germany.
61-104156    5/1986  Japan.
298252       3/1928  United Kingdom.
93-18299     9/1993  WIPO.

*Primary Examiner*—Lesley D. Morris
*Attorney, Agent, or Firm*—Kenyon & Kenyon

[57] ABSTRACT

The nozzle plate according to the present invention includes an axial passage for a fluid, particularly for a fuel, which is made up in the downstream direction by a filter, a ring chamber and an uninterrupted ring gap following one another. Using this arrangement, a cohesive tulip-shaped jet lamella can be produced which thins out in the downstream direction and then disintegrates into tiny droplets. As a consequence, the exhaust emission of an internal combustion engine can be further reduced and likewise a reduction of the fuel consumption can be achieved.

The nozzle plate is suited particularly for injection valves in fuel injection systems of internal combustion engines with externally supplied ignition which compress the mixture.

40 Claims, 16 Drawing Sheets

5,730,368

NOZZLE PLATE, PARTICULARLY FOR INJECTION VALVES AND PROCESSES FOR MANUFACTURING A NOZZLE PLATE

FIELD OF THE INVENTION

The present invention relates to a nozzle plate, particularly for injection valves, and a process for manufacturing a nozzle plate.

BACKGROUND INFORMATION

It is already known from the German Application No. 27 23 280 how to build an element for breaking up fuel in the form of a level, thin disk, which has a multitude of curved, narrow slits, on a fuel injection valve downstream from a regulating opening. The curved slits, which are introduced into the disk through etching, provide through their geometry, i.e., with their radial width and their curve length, that a fuel mist is formed which breaks up into small droplets. The curved slits which are arranged into groups break up the fuel according to their geometry introduced in the horizontal level. The individual slit groups must be introduced very precisely with respect to one another so that the breaking up of the fuel is achieved in the desired manner. Over the entire axial extension of the breaking-up element, the curved slits have in each case a constant opening breadth. The atomization should thus be improved only through the horizontal, radially formed geometry of the slits in the plane of the breaking-up element. Due to the slits which are formed in groups, it is not possible to achieve an entirely uniform atomization of the fuel.

SUMMARY OF THE INVENTION

In contrast, the nozzle plate according to the present invention has the advantage that a uniform, very fine atomization of the fuel is achieved without additional energy, which has a markedly improved atomization quality with respect to known nozzle plates. This is achieved in that the nozzle plate has at least one uninterrupted ring gap so that the fuel to be ejected forms a cohesive, ring-shaped jet lamella immediately downstream of the ring gap. Depending on the geometry of the nozzle plate or rather the ring gap, this lamella has a truncated-cone-like or rather tulip-shaped form. Due to the surface tension, the fuel cone becomes thinner and thinner in the downstream direction and thus with increasing diameter in its fuel film strength, until it breaks apart into very tiny droplets. Compared to the prior art, these fine droplets have a reduced so-called Sauter Mean Diameter (SMD), i.e., a reduced average drop diameter of the ejected fuel, it being possible to achieve SMDs of <60 µm. As a consequence, the exhaust emission i.e. of an internal combustion engine can be further reduced and likewise a reduction of the fuel consumption can be achieved.

Another advantage provided by the arrangement according to the present invention is that a uniform distribution of the ejected fuel is achieved on a comparably large ejection area. As a result, there is a lower droplet packing density in the fuel spray formed after the disintegrated lamella, and a good intermixture with the induction pipe air flow of the internal combustion engine is achieved. Moreover, there is also a decreased risk of droplet coagulation, i.e., a reunification into larger drops.

One particularly advantageous feature of the nozzle plate according to the present invention is a presence of an integrated, fine-pored filter upstream from the ring gap. The function of the filter is to prevent dirt particles entrained in the fuel which are equal to or greater than the ring gap breadth from entering into the nozzle plate. As a result, the ring gap cannot become clogged. Moreover, the filter is a flow rectifier, which settles the incoming fuel and thus reduces turbulences such as flow fluctuations and eddies. In order to produce a stable, finely atomized lamella, precisely this sort of low-turbulence flow is necessary in the nozzle plate.

Moreover, it is also advantageous that by changing the axial ring gap height, it is possible to influence the lamella angle. However, a variation of the ring gap height leads only to insignificant flow rate changes since the flow in the ring gap is relieved on one side. Thus, the flow rate and the lamella angle can be set separately from one another via the ring gap breadth and via the ring gap height, respectively.

Nozzle plates according to the present invention can also be used in an advantageous manner to produce lamellae whose center axes do not run parallel to the valve longitudinal axis, in which case one can speak of inclined jet valves. These inclined jets can be produced by forming either a circular ring gap off-center from the valve longitudinal axis or a ring gap having a shape deviating from a circle. An inclined jet valve is useful when, due to structural reasons, an injection valve cannot be fitted into the induction pipe of an internal combustion engine with the necessary tilt. With the new nozzle plates, it is nonetheless possible to aim directly at an intake valve.

A further advantageous embodiment according to the present invention is obtained through the use of dual ring gaps in a nozzle plate. A tulip-shaped lamella thus issues from each ring gap. In conjunction with multi-point injection, such a nozzle plate is particularly suitable when injection is desired with a single injection valve to in each case two intake valves per cylinder of an internal combustion engine.

For technical, flow-related reasons, it is particularly advantageous to provide an axial ring gap offset. The ring gap offset results in the radial speed component of the flow produced by the formation of the ring chamber being largely maintained. The flow running length in the narrowest cross-section of the ring gap is, namely, reduced to a minimum. With the ring gap offset, a further improvement in the laminarity of the flow is achieved so that turbulences in the lamella are further reduced, an improved atomization of the fuel occurring in the long run as a result. Moreover, a greater influenceability of the ejection angle as a function of the type and magnitude of the ring gap offset is obtained in an advantageous manner.

The process according to the present invention for manufacturing a nozzle plate is advantageous since known processes are combined with processes for manufacturing microstructures, it being possible as a result to produce a multitude of nozzle plates simultaneously in exactly the same design in a cost-effective manner. On a so-called panel with a specified sheet size, namely, several hundred nozzle plates according to the present invention arranged in a grid-shaped manner can be produced simultaneously, the work expense per nozzle plate being significantly reduced.

It is particularly advantageous to use in manufacturing the nozzle plate according to the present invention processes from microstructuring, such as diamond machine cutting or ablation using excimer lasers, together with the processes of injection molding and electroplating. This manufacturing technology is hitherto unknown. A further advantage consists in that with an extremely precisely manufactured

DETAILED DESCRIPTION OF THE INVENTION

Figure 1:
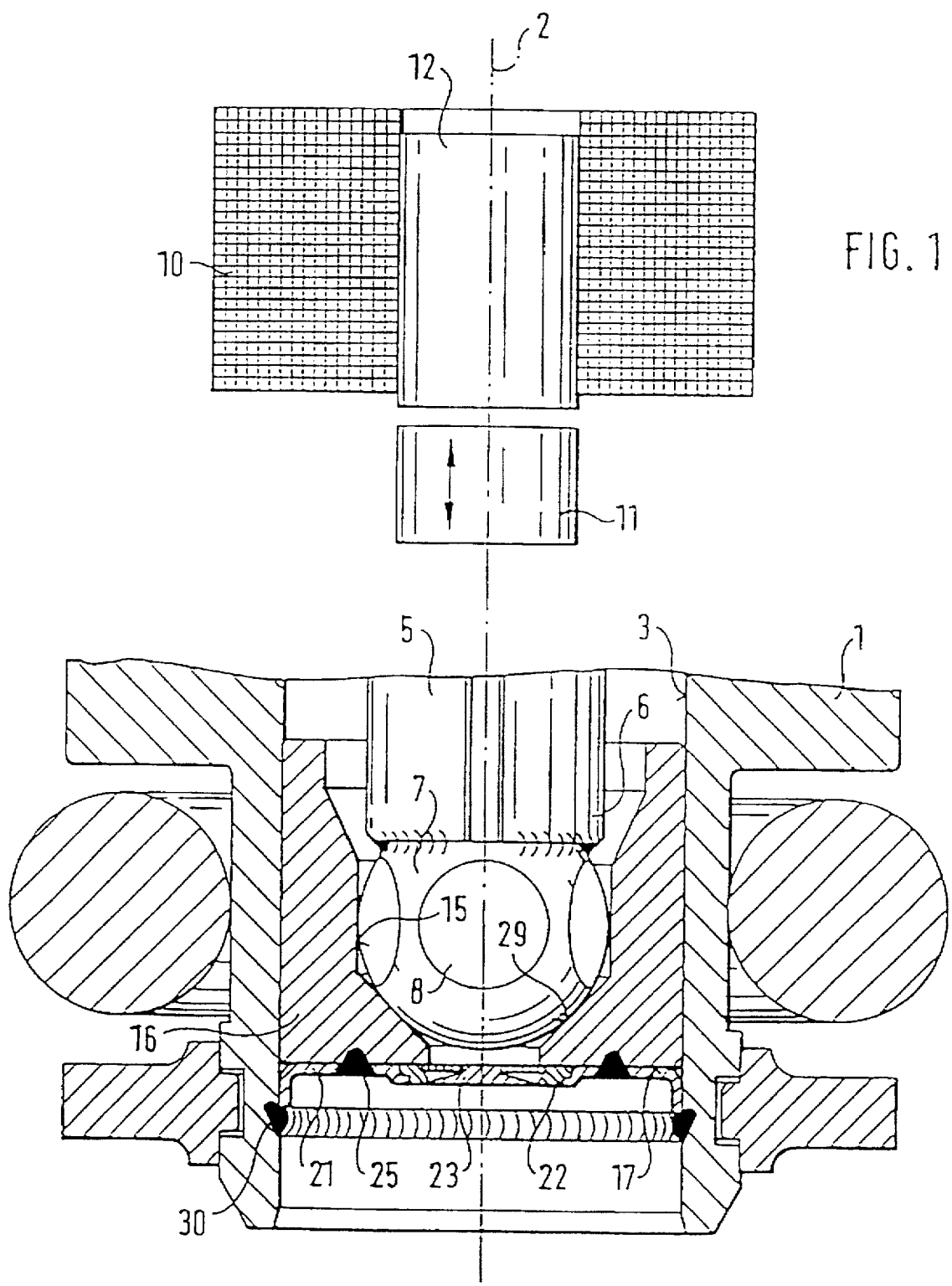
FIG. 1 shows a partially view of an injection valve having a nozzle plate according to the present invention.

In FIG. 1, a valve is shown partially as an exemplary embodiment of the present invention in the form of an injection valve for fuel injection systems of internal combustion engines with externally supplied ignition which compresses the mixture. The injection valve has a tubular valve-seat support 1 in which a longitudinal opening 3 is formed concentrically to a valve longitudinal axis 2. In the longitudinal opening 3, for example, a tubular needle valve 5 is arranged, which is joined on its downstream end 6 to, for example, a ball-shaped valve-closure member 7 on whose circumference, for example, five flat areas 8 are provided.

The actuation of the injection valve takes place in a known manner, e.g., electromagnetically. A sketched electromagnetic circuit having a magnetic coil 10, an armature 11 and a core 12 is used for axially moving the needle valve 5 and thus for opening the injection valve contrary to the spring tension of a resetting spring not shown or rather closing it. The armature 11 is joined to the end of the needle valve 5 facing away from the valve-closure member 7 by, e.g., a welding seam using a laser and aligned with the core 12.

To guide the valve-closure member 7 during the axial movement, a guide opening 15 of a valve-seat member 16 is used. In the end of the valve-seat support 1 facing away from the core 12 and lying downstream, the cylindrical valve-seat member 16 is tightly installed by welding in the longitudinal opening 3 running concentrically to the valve longitudinal axis 2. On its lower face 17 facing away from the valve-closure member 7, the valve-seat member 16 is joined concentrically and solidly to a supporting disk 21 designed to be, for example, cup-shaped which thus lies directly adjacent to the valve-seat member 16. The supporting disk 21 has a similar shape to cup-shaped apertured spray disks which are already known, a middle region of the supporting disk 21 being provided with a graded feed-through opening 22 in order to accommodate in it a nozzle plate 23 according to the present invention.

The joining of the valve-seat member 16 and the supporting disk 21 takes place, for example, by way of a circumferential and tight first welding seam 25 formed using a laser. This type of assembly avoids the risk of an undesired deformation of the supporting disk 21 in its middle region with the feed-through opening 22 and the nozzle plate 23 installed therein. Moreover, the supporting disk 21 is joined to the wall of the longitudinal opening 3 in the valve-seat support 1, for example, by a circumferential and tight second welding seam 30.

The insertion depth of the valve-seat part consisting of the valve-seat member 16 and the cup-shaped supporting plate 21 into the longitudinal opening 3 determines the magnitude of the travel range of the needle valve 5 since the one end position of the needle valve 5 with a non-energized magnetic coil 10 is established by the abutment of the valve-closure member 7 on a valve-seat surface 29 of the valve-seat member 16. The other end position of the needle valve 5 is established with an energized magnetic coil 10, for example, by the abutment of the armature 11 on the core 12. The path between these two end positions of the needle valve 5 thus represents the travel range.

The ball-shaped valve-closure member 7 interacts with the valve-seat surface 29 of the valve-seat member 16 which is decreasing like a truncated cone in the direction of flow, which valve-seat surface 29 is formed in the axial direction between the guide opening 15 and the lower face 17 of the valve-seat member 16.

The nozzle plate 23 arranged in the feed-through opening 22 of the supporting disk 21 and restrained by the supporting disk 21 directly on the face 17 of the valve-seat member 16 is shown in FIG. 1 only in a simplified and exemplary manner and is described in greater detail based on the subsequent figures.

Figure 2A:
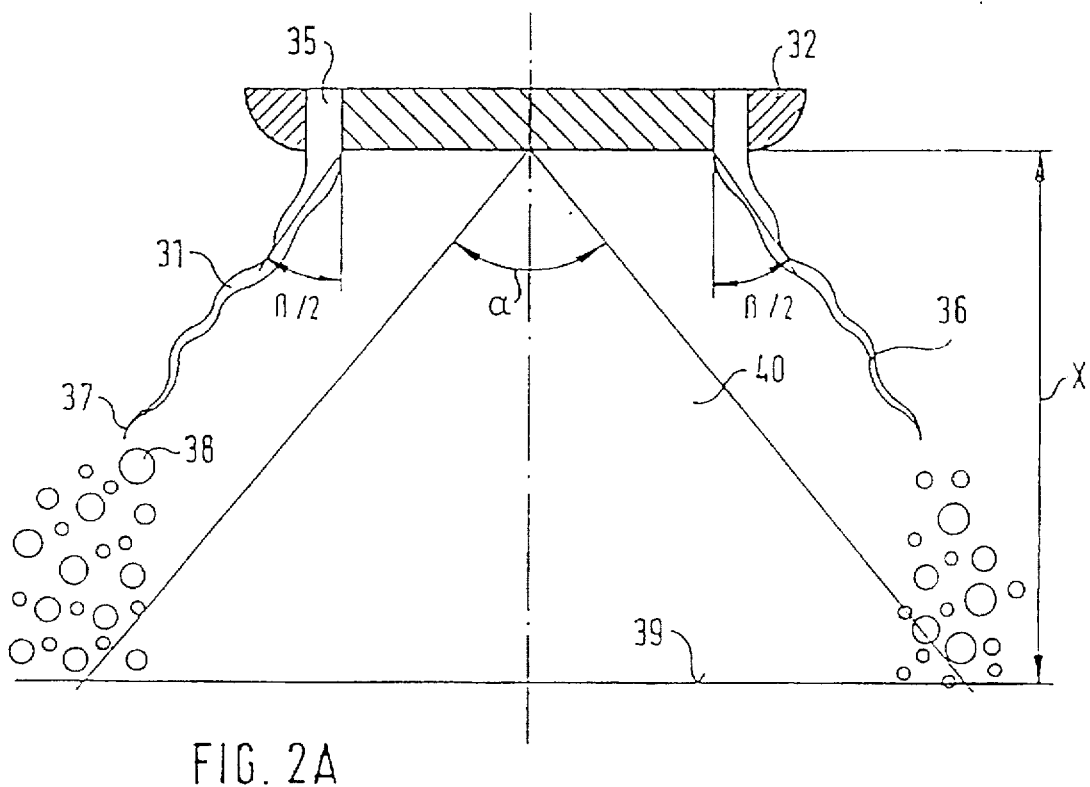
FIG. 2A shows a physical atomization principle on a ring gap nozzle according to the present invention.
Figure 2B:
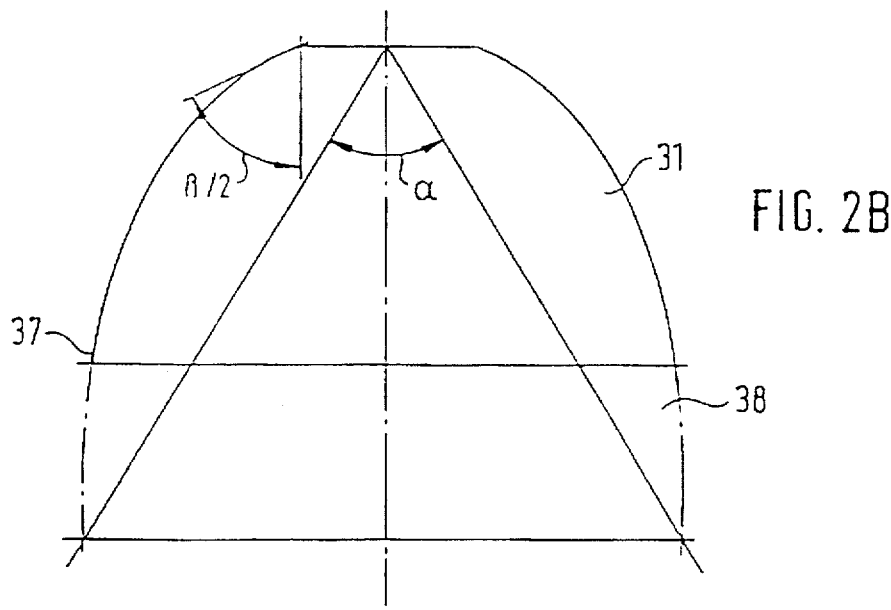
FIG. 2B shows a basic shape of a lamella produced using a ring gap nozzle according to the present invention.

In FIG. 2A, the physical atomization principle and the origin of a ring-shaped lamella 31 on a ring gap nozzle 32 is shown first in a sketch of the principle, whereas FIG. 2B shows the basic shape of the tulip-shaped lamella 31 produced using the ring gap nozzle 32. The principles of lamella formation of fluids can be transferred very easily, for example, from a known hollow cone nozzle to a ring gap nozzle 32, as is found in the nozzle plate 23 according to the present invention. The present invention is based on the principle of producing a fuel spray with the largest possible droplet overall surface. A large droplet overall surface is equivalent to the breaking up of the fuel quantity into as many small droplets as possible. To produce a large droplet overall surface, as much as possible of the existing flow energy (kinetic energy in the outflow of fuel at the nozzle) must be used against the surface tension in the emerging fuel jet. The surface tension tries to keep the free surface of the fluid jet small.

One jet geometry having a large surface per fuel quantity is a liquid hollow lamella 31 which is as thin as possible, as is shown particularly well is FIG. 2B. In the nozzle plate 23 according to the present invention, this lamella 31 is shaped during the passage through a narrow ring gap 35 which is not interrupted over the circumference and which has the greatest possible diameter. In the downstream direction, a thinning out of the lamella 31 takes place, the thinning out being encouraged by a corresponding increase of the lamella circumference caused by the tulip shape. As a result, the free jet surface is further increased, and the lamella 31 disintegrates into correspondingly smaller droplets 38. Moreover, the spatial droplet packing density becomes smaller for a larger lamella cross-section, making droplet reunifications into larger drops (droplet coagulations) in the fuel spray less probable. The lamella disintegration takes place starting at a defined axial distance from the ring gap 35. Due to aerodynamic interactions with the gas surrounding the lamella 31, the lamella surface becomes increasingly wavy at greater distances from the nozzle plate 23 (Taylor's oscillations 36), these oscillations 36 being shown in an exaggerated manner in FIG. 2A. The instability present in the lamella 31 becomes increasingly great with increasing distance from the ring gap 35 until the point 37, at which a sudden disintegration into very small fuel droplets 38 occurs. It is advantageous in this embodiment of the present invention that except for the resulting waviness of the lamella 31, hardly any other disturbances occur. For example, undesired local enlargements in the lamella 31 which is thinning out downstream, known as strands, are avoided.

Despite the cone-like widening of the lamella to a diameter which is greater than that at the ring gap 35, a spray opening angle α can be realized which is relatively small. This is due to the tulip-shaped spreading of the lamella. The spray opening angle α is a full angle, which reflects the radial spreading of the lamella, which results at an imaginary impact surface 39 of the droplets 38 at a defined distance x (e.g., 100 mm) from the nozzle plate 23. On the other hand, the angle of the lamella 31 occurring directly at the ring gap nozzle 32 is known as the ejection angle β. Due to the tulip shape of the lamella 31, the ejection angle β is always greater than the spray opening angle α. The tulip shape is a result of a low-pressure core in the central lamella cavity 40 filled with ambient gas. Propelled by the lamella 31, motion in the form of a "Hill's vortex" arises in the gas. The whirling motion results in a low pressure, which "pulls" the lamella 31 inwards in a tulip shape in the downstream direction.

It is particularly important for the lamella 31 to remain uninterrupted over its circumference. Otherwise, two free lamella ends arise on a lamella crack point, which pull together in accordance with the physics of surface tension into a thick bulge. This results in larger drops or strands at such locations. In addition, the tulip-shaped lamella flow is disrupted at a lamella interruption. The lamella 31 then flows in a more cone-like shape with a correspondingly larger spray opening angle α.

A lamella 31 which is uninterrupted over the circumference is attained with the uninterrupted ring gap 35 provided in the nozzle plate 23. To prevent the very narrow ring gap 35 from becoming clogged by dirt particles in the fuel, it is useful to arrange a filter 42 (shown in FIG. 3) in the nozzle plate 23. Moreover, as a requirement for an optimal lamella 31, an even distribution of the incoming flow pulse over the circumference should be provided for on the incoming side of the ring gap 35.

To keep the closed lamella 31 from disintegrating prematurely at too small of a diameter, the ring gap inner flow must issue laminarly from the nozzle plate 23. Flow fluctuations are to be avoided so as not to bring the unstable lamella 31 prematurely to disintegration oscillations. It is precisely these requirements listed here which are fulfilled with the nozzle plate 23 according to the present invention which contains at least one uninterrupted ring gap 35 and at least one filter 42.

Figure 3:
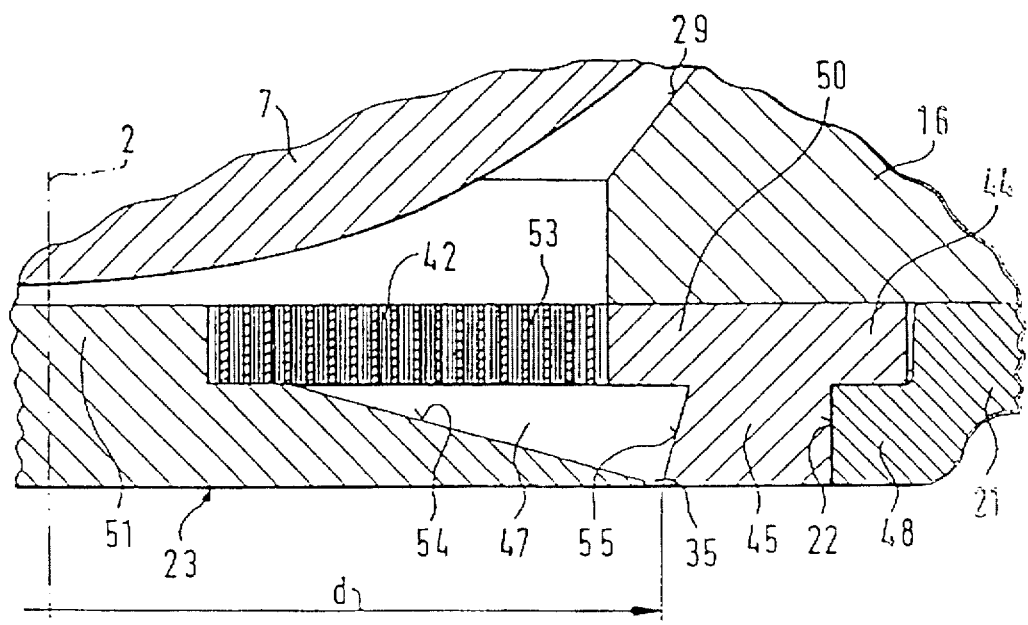
FIG. 3 shows a first exemplary embodiment of a partially shown nozzle plate in an axial section according to the present invention.

FIG. 3 shows the nozzle plate 23 partially in an axial section and in the state in which it is mounted on an injection valve. The nozzle plate 23 is designed as a level, flat, circular disk which is graded on its circumference, for example, in the axial direction. The nozzle plate 23 is centered in the supporting disk 21. The fastening of the nozzle plate 23 to the injection valve and particularly to the valve-seat member 16 takes place, for example, through clamping, which is possible due to the contour of the supporting disk 21. This type of clamping as indirect fastening of the nozzle plate 23 to the valve-seat member 16 has the advantage that unlike processes such as welding or soldering, a temperature-related deformation of the fine ring gap geometry is completely avoided. The graded feed-through opening 22 in the supporting disk 21 is manufactured very precisely in terms of its dimensions in order to accommodate the nozzle plate 23 extremely precisely without stresses. Instead of the graded external contour, the nozzle plate 23 can also have a external contour which is entirely level in the axial direction.

As a result of the process according to the present invention for manufacturing the nozzle plate 23, a structure results which is formed in the axial direction by two sections 44 and 45 which immediately follow one another. The upper section 44 is designed facing the valve-closure member 7 and the valve-seat member 16, whereas the lower section 45 represents the downstream end of the nozzle plate 23 facing away from the valve-closure member 7. In the upper section 44, which has, for example, a slightly greater diameter than the lower section 45, the filter 42 is provided. On the other hand, the lower section 45 of the nozzle plate 23 is characterized by a ring chamber 47 formed in it with converging lateral surfaces in the downstream direction and by the ring gap 35. Corresponding to the external circumferential contour of the nozzle plate 23, the feed-through opening 22 is also molded in the supporting disk 21. At least in a clamping region 48 directly following radially the feed-through opening 22, the supporting disk 21 has the same axial thickness as the nozzle plate 23. Otherwise, the supporting disk 21 is thinner, for example, formed with two thirds the thickness of the clamping region 48. For a diameter of 5 mm, the nozzle plate 23 has, for example, a thickness of 350 µm, the upper section 44 having, for example, a thickness of 150 µm and the lower section 45 200 µm. These size specifications for the dimensions of the nozzle plate 23 as well as all further dimensions given in the description are provided only to improve understanding and do not limit the present invention by any means.

The above mentioned requirements for attaining an uninterrupted, tulip-shaped lamella 31 of fuel can be fulfilled with the following features of the nozzle plate 23:

fine-pored structure of the filter 42 in the upper section 44 of the nozzle plate 23, low wall thicknesses between the pores of the filter 42, circumferential ring chamber 47 which is not interrupted over the circumference in the lower section 45, which ring chamber 47 continuously decreases in the direction of flow, circumferential, uninterrupted ring gap 35 as a downstream termination of the ring chamber 47.

Figure 4:
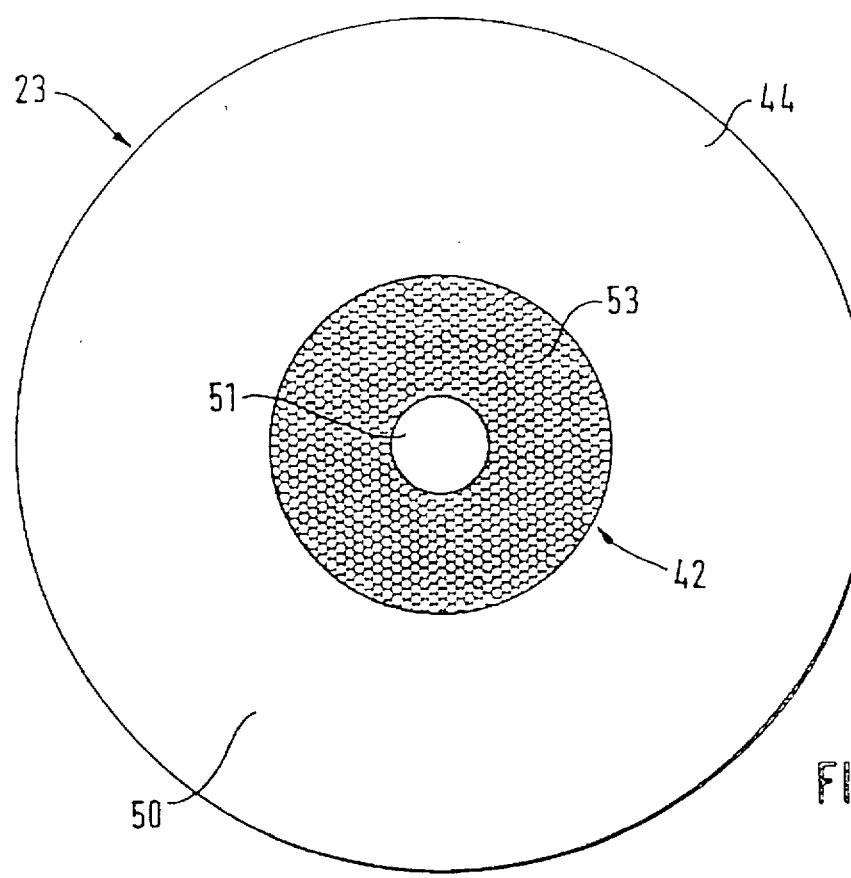
FIG. 4 shows a top view of a nozzle plate with a filter having honeycomb-shaped pores according to the present invention.

The annular filter 42, for example, is arranged in the upper section 44 so that on the outside it is completely surrounded in the circumferential direction by a ring-shaped outer region 50 of the nozzle plate 23 and encloses itself with an inner ring-shaped inner region 51. The outer region 50 and the inner region 51 of the upper section 44 have constant dimensions over its axial thickness and continue in the lower section 45, where they have, however, an altered contour in order to form the ring chamber 47. As a top view of a nozzle plate 23 according to the present invention, FIG. 4 provides a very clear presentation of the arrangement of the filter 42 between the inner region 51 and the outer region 50 in the upper section 44. The fine porousness of the filter 42 is achieved by providing a multitude of, for example, pores 53 which run parallel to the valve longitudinal axis 2, which are separated from one another by thin segments in each case. In FIG. 4, these pores 53 are shown in a honeycomb shape with the cross-section of a hexagon. Besides the honeycomb-shaped structure of the filter 42 with hexagonal pores 53, pores having cross-sections with three, four, five or more edges or which are circular or elliptical are also imaginable. Depending on the size or rather opening breadth b of the ring gap 35, the opening breadth of an individual pore 53 of the filter 42 is equal to, e.g., 35 µm, whereas the wall thickness to the next pore 53 is equal to, e.g., 10 µm.

Figure 15:
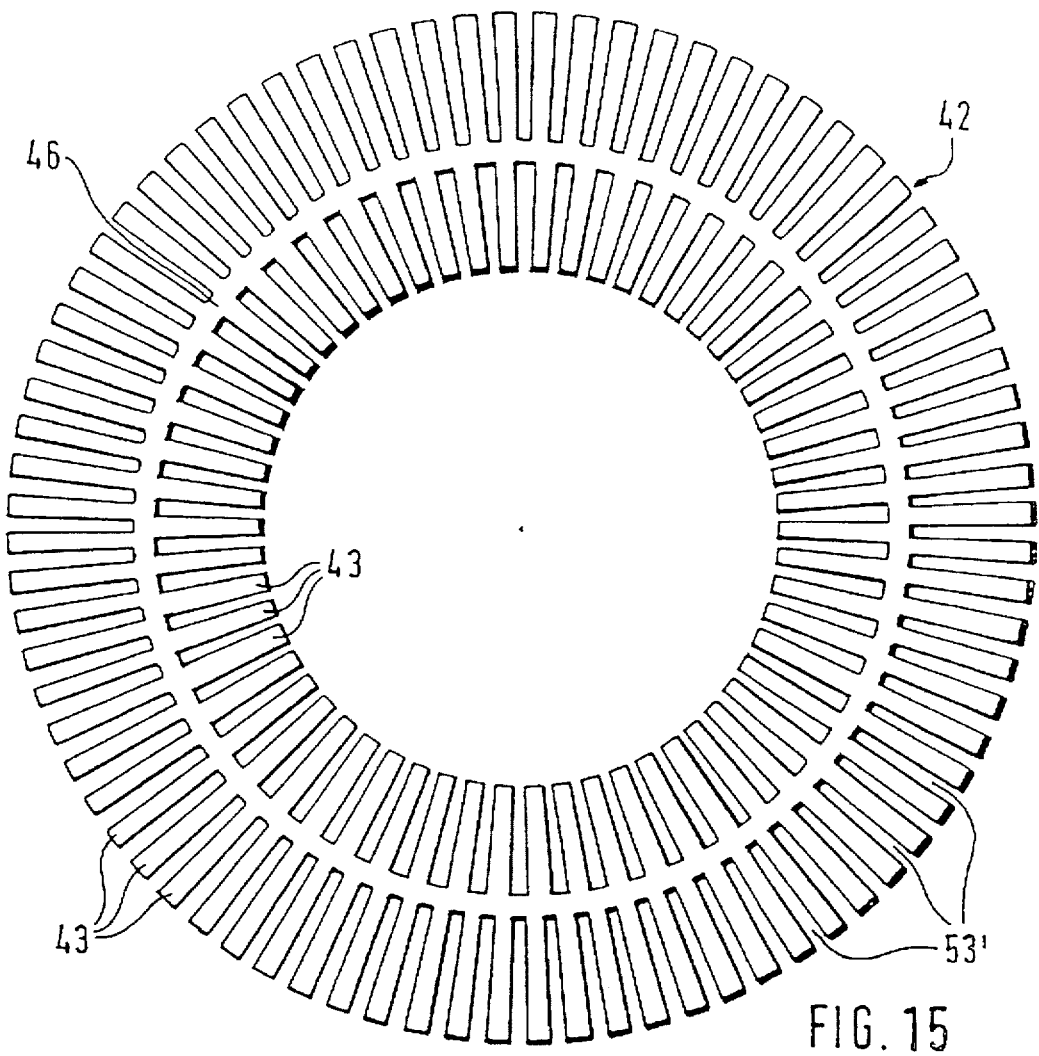
FIG. 15 shows a filter with radial slits according to the present invention.

A further variant not shown provides that segments extending radially and arranged circularly cross again and again at very small distances so that a latticed pattern arises in the filter 42. The filter 42 in FIG. 15 has a somewhat modified structure from this, which filter 42 is formed, for example, from two annular filter rings 43 of a different diameter, the filter ring 43 with the smaller diameter being completely surrounded by the outer filter ring 43 with the larger diameter and both filter rings 43 being joined via a circular filter segment 46. Each of the two filter rings 43 consists of a multitude of radial slits 53', which correspond to the pores 53 in the other exemplary embodiments of the present invention and which are separated from one another in each case by narrow segments.

The filter 42 has the function of preventing dirt particles entrained in the fuel that are greater than the ring gap breadth b from entering into the nozzle plate 23. The ring gap 35 cannot become blocked as a result. For a ring gap breadth b of 50 µm, it thus makes sense to use pores 53 having opening widths of about 35 µm in the filter 42. Moreover, the filter 42 is a flow rectifier, which settles the incoming fuel from the valve-seat surface 29 and thus reduces turbulences such as flow fluctuations and eddies. To produce a stable, finely atomizing liquid lamella 31, a laminar flow with as little turbulence as possible is necessary at the ring gap outlet. A dimensional ratio of axial length to opening breadth of the pores 53 of 4:1 has proven particularly favorable with regard to the flow rectification effect, so that for a thickness of the upper section 44 of the nozzle plate 23 of 150 µm, which corresponds to the axial length of the pores 53, the opening breadth already mentioned of about 35 µm results again. Besides the stated function, the filter 42 also has a stability function since it is the only connection between the outer region 50 and the inner region 51 and thus holds together the nozzle plate 23. Otherwise, the nozzle plate 23 would consist of two separate parts, which would have to be fastened separately to the injection valve.

Figure 5:
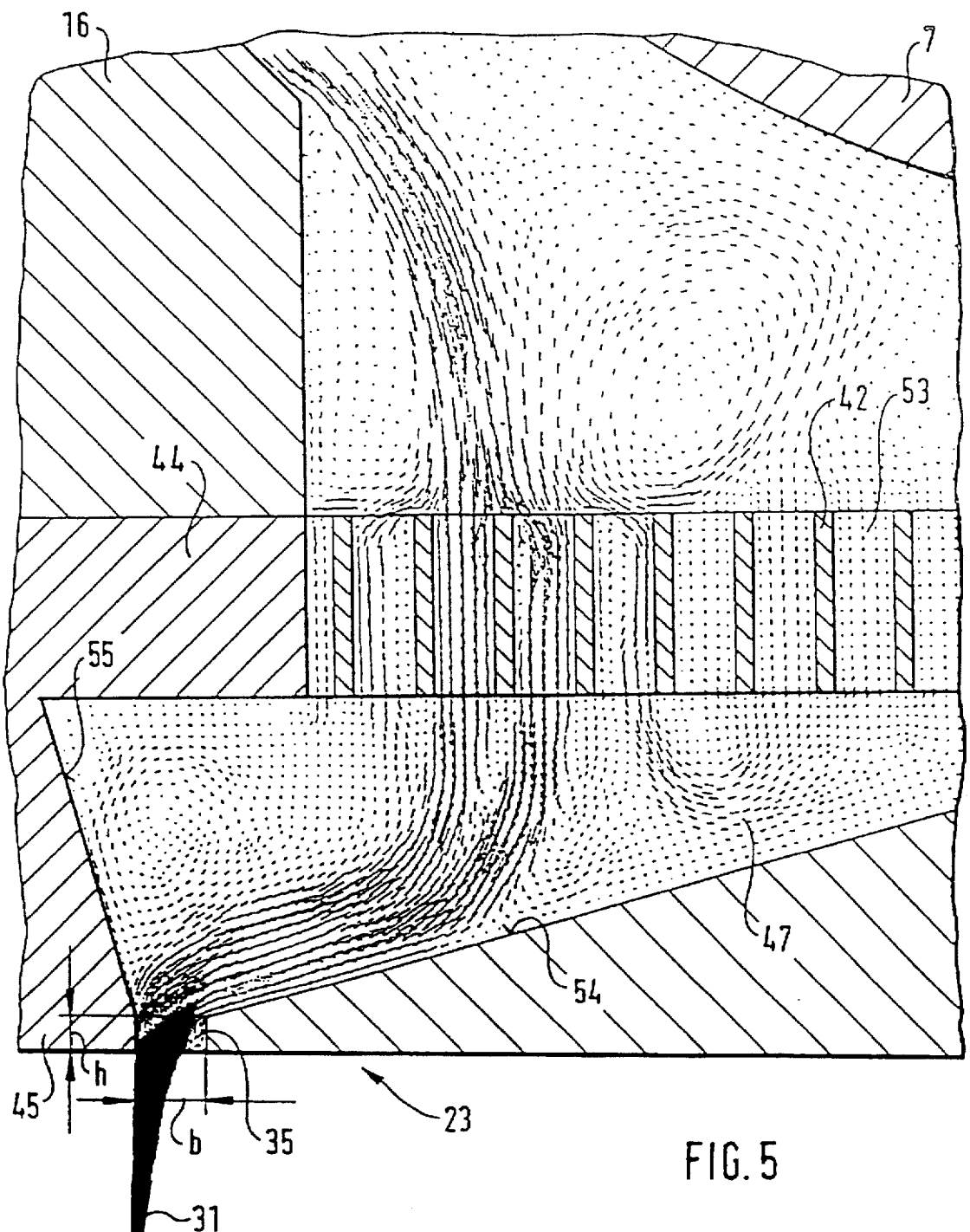
FIG. 5 shows flow conditions in the area of a nozzle plate.

In FIG. 5, the flow conditions between the valve-seat surface 29 and the ring gap 35, and most particularly in the ring chamber 47, can be recognized in an enlarged presentation. The individual flows entering through the many filter pores 53 into the ring chamber 47 exist separate from one another immediately downstream of the filter 42. They require an intermixing path, which is provided by the ring chamber 47 in the ideal form. The ring chamber 47 is characterized mainly by an inner flat wall 54 and an outer steep (e.g., also perpendicular) wall 55. Since the inner wall 54 is designed immediately downstream of the filter 42 and the individual flows are directed towards the inner wall 54, the wall 54 serves as an impact, deflection or rather flow-off surface. On the other hand, the steep wall 55 is shaped radially displaced with respect to the filter 42 and limits the outer diameter of the ring chamber 47.

The flow is thus homogenized over the cross-section of the ring chamber 47. Namely, a homogeneous flow must enter into the ring gap 35 so that a uniform, finely atomizing liquid lamella 31 without strands issues from it. Disadvantageous strands in the lamella 31 could occur if the individual flows produced by the filter 42 penetrate all the way into the ring gap 35. The inner wall 54 and the outer wall 55 thus run in the downstream direction on one another up to the ring gap 35, a continuous reduction of the cross-section being associated with this so that the fluid is steadily accelerated. Additionally, turbulence in the flow is reduced by this acceleration of the flow. The geometry of the ring chamber 47 guarantees that a large part of the flow is positioned against the flat inner wall 54 or rather channeled to it. The flow thus receives a strong radial speed component in the direction of the ring gap 35. Despite the adjoining ring gap 35 which, as a function of its manufacture (MIGA technology—Microstructuring, Galvanoshaping and Molding) runs perpendicularly, i.e., parallel to the valve longitudinal axis 2, the emerging lamella 31 still has a radial speed component. This is also necessary in order to expand the lamella 31 downstream of the nozzle plate 23 in its diameter in a tulip shape. The uninterrupted ring gap 35 represents the outlet of the ring chamber 47. The ring gap diameter d should be chosen as large as possible so that it is, as can be recognized in FIGS. 3 and 5, for example, even greater than the outer diameter of the filter 42. Normally, the ring gap diameter d is between 0.5 and 5 mm. For a sufficiently thin liquid lamella 31 and a sufficiently fine atomization, the ring gap breadth b should not exceed 50 µm. The lower limit for the ring gap breadth b is approx. 25 µm. The ring gap breadth b must be adjusted in the allowable limits with the ring gap diameter d to the respective specified flow rate since the ring gap cross-section area is directly related to the flow rate. The axial extension of the ring gap 35, i.e., the ring gap height h, is less than the ring gap breadth b (h<b) so that the flow arriving from the ring chamber 47 does not completely lose its radial speed component due to an excessively vertical, axial orientation. With the ratio of the ring gap height h to breadth b, the spray opening angle α of the lamella 31 can be varied deliberately, which spray opening angle α increases as the ratio h:b decreases. In other words, with a change in the ring gap height h, a variation of the ejection angle β and thus the spray opening angle α of the lamella 31 is possible. However, a variation of the ring gap height h for a constant ring gap breadth b leads only to insignificant flow rate variations since the flow in the ring gap 35 is relieved on one side due to the geometry of the inner wall 54 of the ring chamber 47, this occurring on the side of the ring gap 35 issuing from the wall 54. Directly upon emergence of the fuel from the ring gap 35, the lamella 31 has, e.g., a thickness or rather film strength of ⅔ b, whereas its thickness has dropped to <½ b upon disintegration into small droplets 38 near to the point 37.

Using the exemplary embodiment of the present invention shown in FIG. 3, a rotationally symmetrical, tulip-shaped hollow-conical jet (lamella 31) can be produced. These jet patterns are particularly well suited to injection valves which eject on to one intake valve per cylinder of an internal combustion engine. The ring gap 35 has a relatively large diameter d, so that large static flow rates can be achieved for a narrow ring gap 35. Since the filter 42 has a smaller outer diameter than the ring gap 35, a ring gap cover on the incoming side is given by the outer region 50, which helps to ensure that the flow is forced to assume a radial component in the direction of the ring gap 35 in the ring chamber 47.

Figure 6:
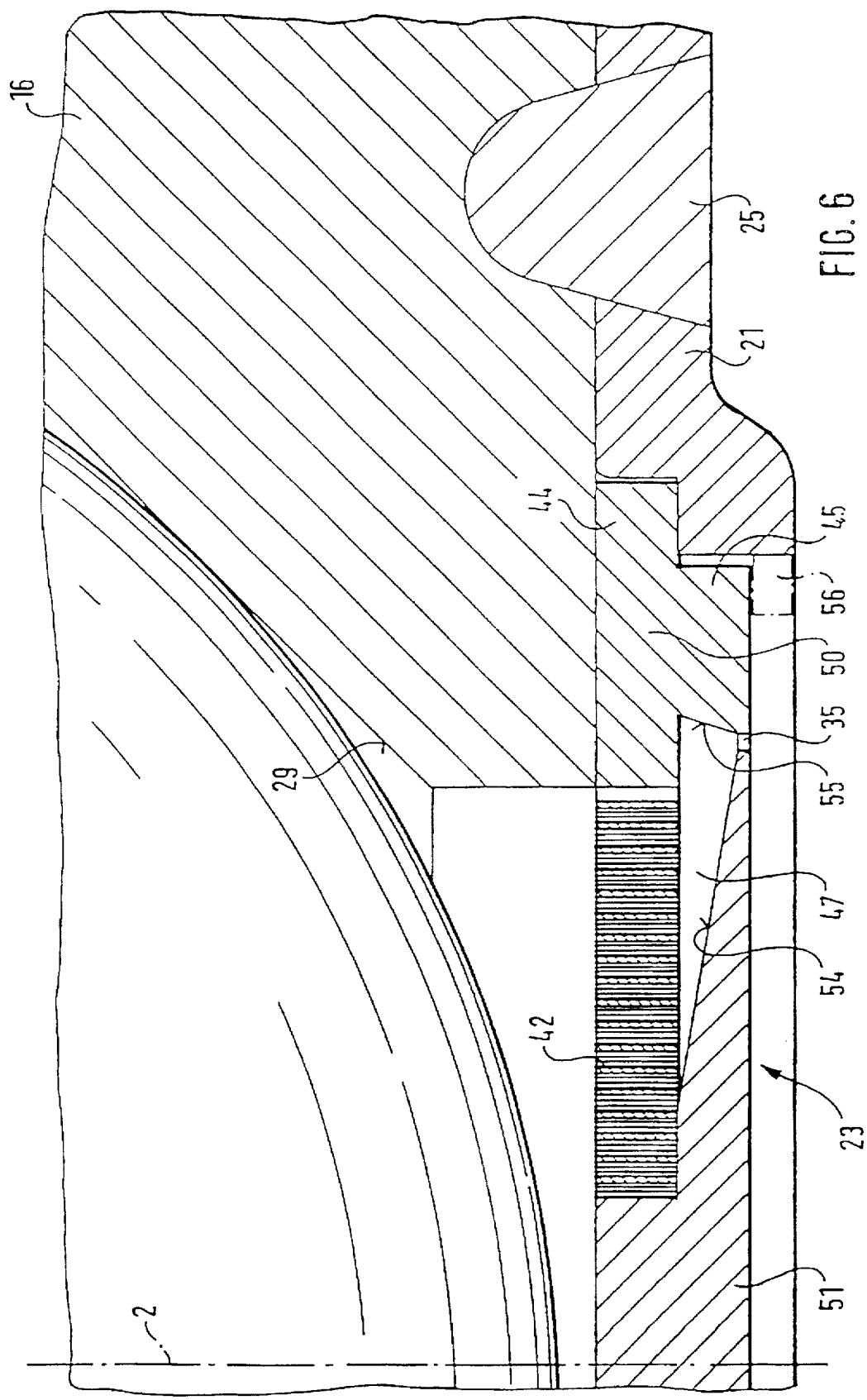
FIG. 6 shows a second exemplary embodiment of a partially shown nozzle plate in an axial section according to the present invention.

A further exemplary embodiment of the present invention of a nozzle plate 23 is shown in FIG. 6 which differs from the exemplary embodiment shown in FIG. 3 primarily through a reduction of the axial thickness of the nozzle plate 23. The lower section 45 has, for example, now only the same thickness as the upper section 44 or is even thinner than this section 44. Accordingly, the ring chamber 47, and particularly the inner wall 54, is even flatter, the spray opening angle α of the lamella 31 being increased as a result. Moreover, it is possible to mix the individual flows entering from the filter 42 in the ring chamber 47 more uniformly with one another into a homogeneous flow through even greater deflection. Since the nozzle plate 23 is thinner than in the first exemplary embodiment of the present invention, it lies recessed in the feed-through opening 22 of the supporting disk 21, given the same supporting disk 21. The sensitive ring gap outlet geometry is thus well protected against mechanical influences from outside. With nozzle plates 23 which have a fully level, vertical outer contour, it makes sense for the supporting disk 21 at 56 to partially extend under the nozzle plate 23 and the feed-through opening 22 of the supporting disk 21 to then be smaller in this region than the nozzle plate 23 itself (indicated with a dashed line).

Figure 7:
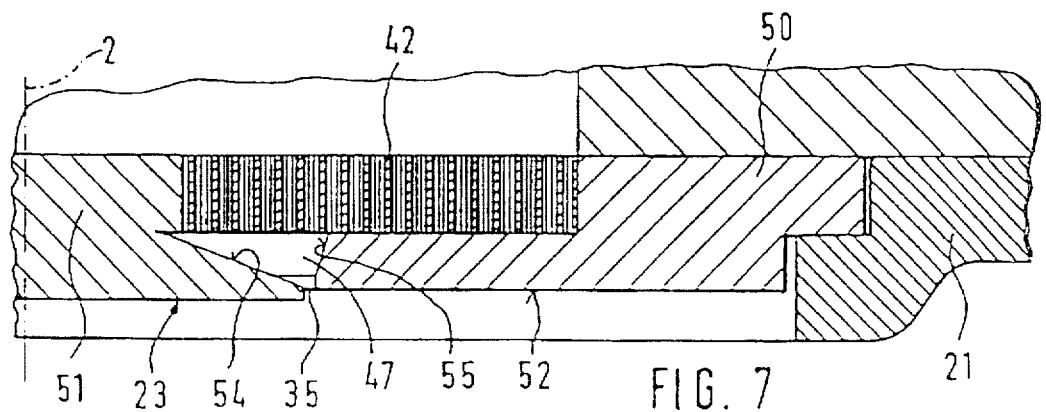
FIG. 7 shows a third exemplary embodiment of a partially shown nozzle plate in an axial section according to the present invention.

FIG. 7 shows an exemplary embodiment of a nozzle plate 23 of the present invention having a smaller ring gap diameter d. Such a design is necessary for small static flow rates in order to avoid having to fall below the lower limit for the ring gap breadth b. Since the ring gap 35 is now no longer designed displaced with respect to the filter 42, but instead is provided directly downstream from individual pores 53, the fuel can at least partially flow directly through the ring chamber 47 parallel to the valve longitudinal axis 2 so that the flow enters into the ring gap 35 with less radial deflection. If the spray opening angle α becomes too small as a result, a cover could be provided directly upstream of the ring gap 35 so that the ring gap 35 is again covered on the incoming side and the flow streams into the ring chamber 47 on a smaller diameter.

One particularly advantageous feature of this arrangement with the ring gap 35 designed directly downstream from the filter 42 is an axial ring gap offset, i.e., there exists an axial clearance measure between a downstream limiting surface 52 of the outer region 50 and a downstream limiting surface 52' of the inner region 51. In the exemplary embodiment of the present invention shown in FIG. 7, this ring gap offset looks as if the transition of the inner wall 54 of the ring chamber 47 into the one edge of the ring gap 35 lies further downstream than the transition of the outer steep, e.g., also vertical wall 55 into the other edge of the ring gap 35. This axial displacement of the inner region 51 with respect to the outer region 50 is, for example, so large that the transition of the inner wall 54 into the edge of the ring gap 35 lies in the same plane as the downstream limiting surface 52 of the outer region 50. The ring gap offset causes the radial speed component of the flow which is reduced directly downstream of the filter 42 by the arrangement of the ring gap 35 to be reincreased. Moreover, a better laminarity of the flow is achieved which, in turn, is critical in improving the atomization of the fuel. Furthermore, a greater influenceability of the ejection angle β as a function of the magnitude of the ring gap offset is obtained in an advantageous manner.

Figure 7A:
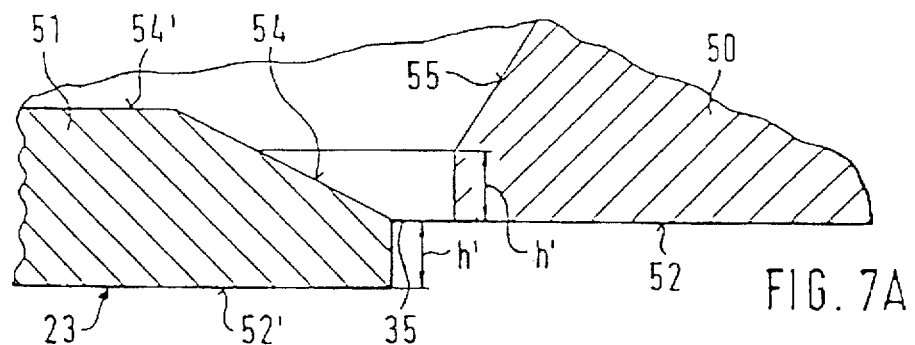
FIG. 7A shows a first exemplary embodiment of ring gap offsets according to the present invention.

From the viewpoint of flow engineering, it is particularly advantageous to provide an axial ring gap offset. The flow running length in the narrowest cross-section of the ring gap 35 is, namely, reduced to a minimum since the edges of the ring gap 35 are no longer directly opposite over the ring gap height h. Five examples of ring gap offsets are shown in FIGS. 7A to 7E in a simplified manner. In the FIGS. 7A to 7C, the two walls 54 and 55 have an opposite slope, as they were also shown in the previous figures. The nozzle plate 23 in FIG. 7A is distinguished from the previously shown nozzle plates 23 primarily in that the two limiting surfaces 52 and 52' lie axially removed from one another by the ring gap edge height h'. In other words, on both sides of the ring gap 35, the vertical edges were left (retained) into which the walls 54 and 55 change into. In the exemplary embodiment of the present invention shown in FIG. 7B, now only the inner region 51 has a vertical edge with the ring gap edge height h', whereas the outer wall 55 of the outer region 50 changes directly into the limiting surface 52 without an edge. Here, the axial distance between the two limiting surfaces 52 and 52' is again exactly the ring gap edge height h'.

Figure 7B:
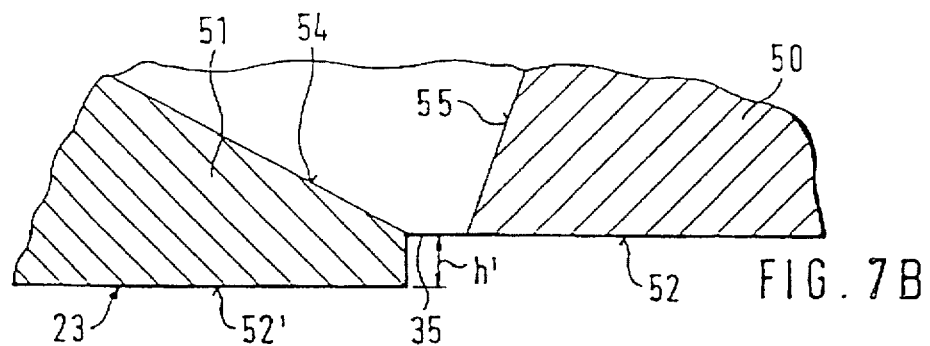
FIG. 7B shows a second exemplary embodiment of ring gap offsets according to the present invention.
Figure 7C:
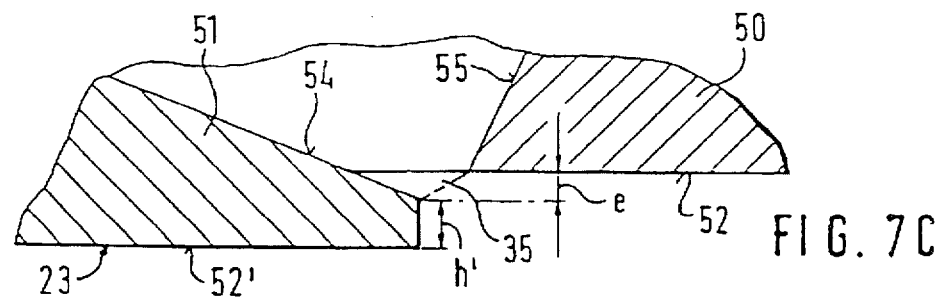
FIG. 7C shows a third exemplary embodiment of ring gap offsets according to the present invention.

On the other hand, the axial offset of the two limiting surfaces 52 and 52' in the nozzle plate 23 in FIG. 7C is formed by the ring gap edge height h' and an offset e. Here, the offset e is the axial measure between the limiting surface 52 of the outer region 50 and the transition of the inner wall 54 into the vertical edge of the inner region 51.

Figure 7D:
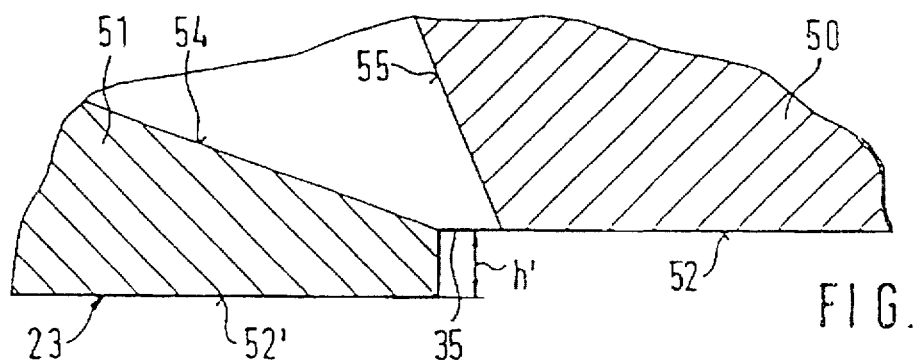
FIG. 7D shows a fourth exemplary embodiment of ring gap offsets according to the present invention.
Figure 7E:
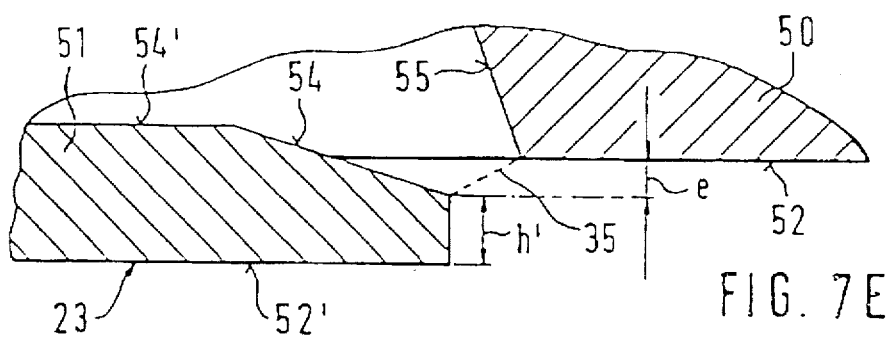
FIG. 7E shows a fifth exemplary embodiment of ring gap offsets according to the present invention.

The ring gap offsets in FIGS. 7D and 7E correspond basically to the arrangements in FIGS. 7B and 7C; however, the nozzle plates 23 are distinguished in the slope of the outer wall 55 of the outer region 50. The outer wall 55 now has a slope direction with a reversed sign with respect to the examples already described, which, however, corresponds to the direction of the inner wall 54, the two walls 54 and 55 still differing from one another in their steepness, i.e., their angle with respect to the valve longitudinal axis 2. It is precisely in nozzle plates 23 having walls 54 and 55 in the same direction that the radial component of the flow can be boosted. A lamella 31 with a broader tulip shape arises. The turbulences in the lamella 31 are further reduced. The nozzle plates 23 with the offset e (FIGS. 7C and 7E) have the advantage that by varying the offset e, the ejection angle β becomes highly influenceable. From the viewpoint of flow engineering, the variant of the ring gap offset shown in FIG. 7E is thus the best solution.

In addition, in FIGS. 7A and 7E, the walls 54 are shown in a modified fashion. Besides the flat inclined wall 54, the ring chamber 47 is also limited by a level, horizontal impact surface 54', facing away from the ring gap 35, of the inner region 51 downstream of the filter 42. This formation of the inner region 51 provides a decrease in the dead volume in the ring chamber 47 and causes a reduction of eddies in the flow so that a further improvement in the laminarity of the lamella 31 is obtained. All of the ring gap offsets described here are also imaginable in the other exemplary embodiments of the nozzle plates 23 according to the present invention.

Figure 8:
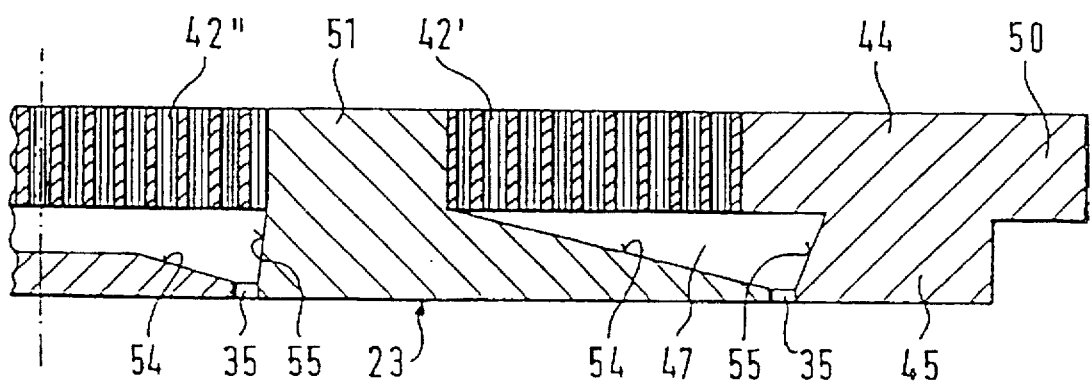
FIG. 8 shows a fourth exemplary embodiment of a partially shown nozzle plate in an axial section according to the present invention.
Figure 9:
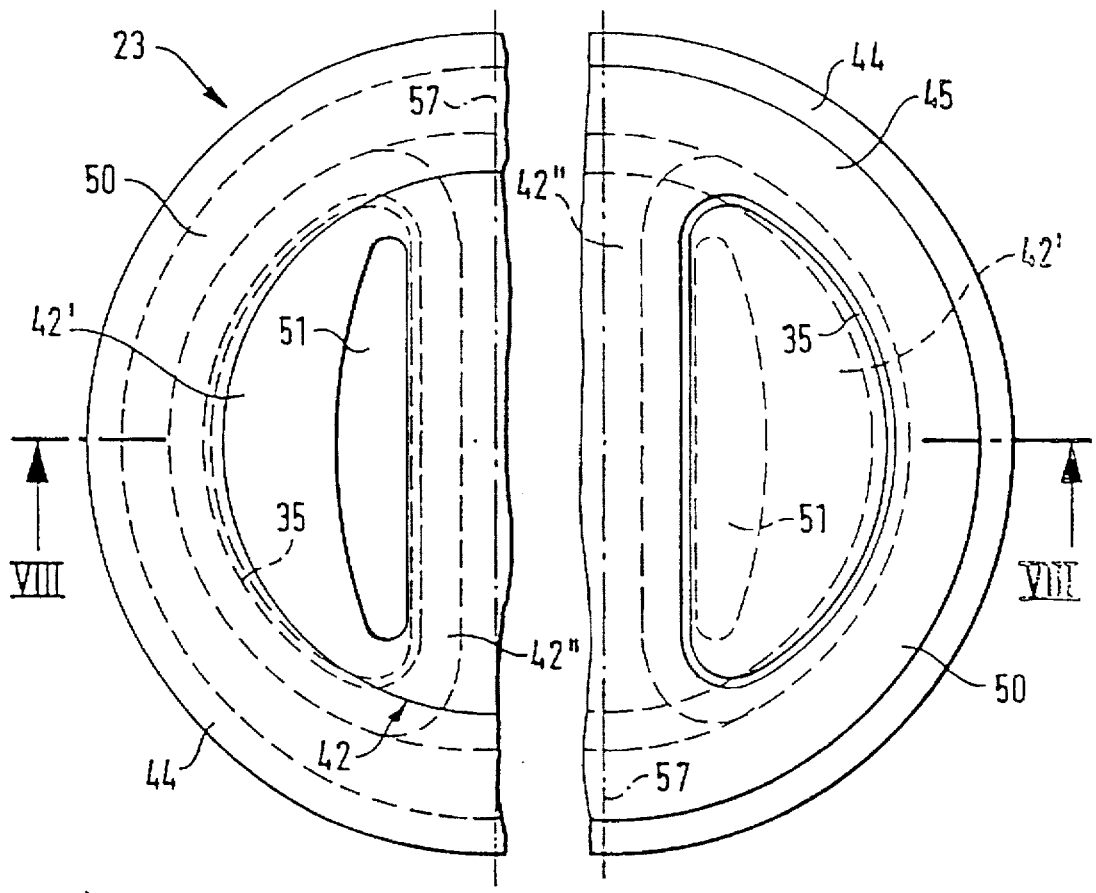
FIG. 9 shows a combined top view (left) and bottom view (right) of a nozzle plate according to FIG. 8.

A further exemplary embodiment of an nozzle plate 23 according to the present invention is shown in FIGS. 8 and 9. FIG. 8 being a transverse representation along the line VIII—VIII in FIG. 9. FIG. 9 is a combined drawing which is formed by a top view (left) and a bottom view (right) of this nozzle plate 23. An exceptional feature is that this nozzle plate 23 has two uninterrupted ring gaps 35, only one ring gap 35 being visible in FIG. 8. The nozzle plate 23 is identically shaped on both sides of the valve longitudinal axis 2 visible in the axial section (FIG. 8), the top view or rather bottom view (FIG. 9) of the nozzle plate 23 being divided by an axis of symmetry 57 into two identically appearing halves. It is very easy to deduce from FIG. 9 that the ring gap 35 is designed uninterrupted in each plate half and has the shape of a distorted oval there. This ring gap arrangement means that the filter 42 and the ring chamber 47 must be designed in a transformed shape. The upper section 44 now appears in the section as if, when observed in the radial direction starting from the circumference, the outer region 50, the filter 42 with a first filter region 42', the inner region 51 and a second inner filter region 42" follow one another.

However, the two filter regions 42' and 42" are designed contiguously and represent a one-part filter 42. The filter 42, which is circular in the outer contour, is interrupted inside two times by the inner region 51, which likewise has a distorted oval shape and is completely surrounded by the filter 42. The ring chamber 47 is now also present in a modified manner since it, corresponding to the arrangement of the filter 42, must likewise have an external and internal region which are directly joined to one another. The ring chamber 47 is characterized primarily by the fact that in the external region, as described hitherto for the other exemplary embodiments, the inner and outer wall 54 and 55 extend from the filter region 42' all the way to the ring gap 35, whereas in the inner region of the ring chamber 47, the inner wall 54 does not reach to the filter region 42" since due to the symmetry along the axis of symmetry 57, fuel streaming in on both sides over the second filter region 42" is to be divided up on the sections of both ring gaps 35 facing the axis of symmetry 57.

A hollow-conical lamella which is not rotationally symmetrical issues from each of the two ring gaps 35. The geometry of the nozzle plate 23 and particularly the ring gap 35 causes lamellae 31 whose center axes do not run parallel to the valve longitudinal axis 2. Instead, there exists between the valve longitudinal axis 2 and each center axis of the lamella 31 a defined divergence angle so that the two lamellae 31 diverge in the form of two jet loads in the downstream direction. In conjunction with multi-point injection, such a nozzle plate 23 is particularly suitable when injection is desired with a single injection valve to in each case two intake valves per cylinder of an internal combustion engine. It should be ensured through suitable angle adjustment that the two lamellae 31 do not overlap since otherwise the single lamella disintegration takes place too early, i.e., while the lamella 31 is not sufficiently thinned out.

Figure 10:
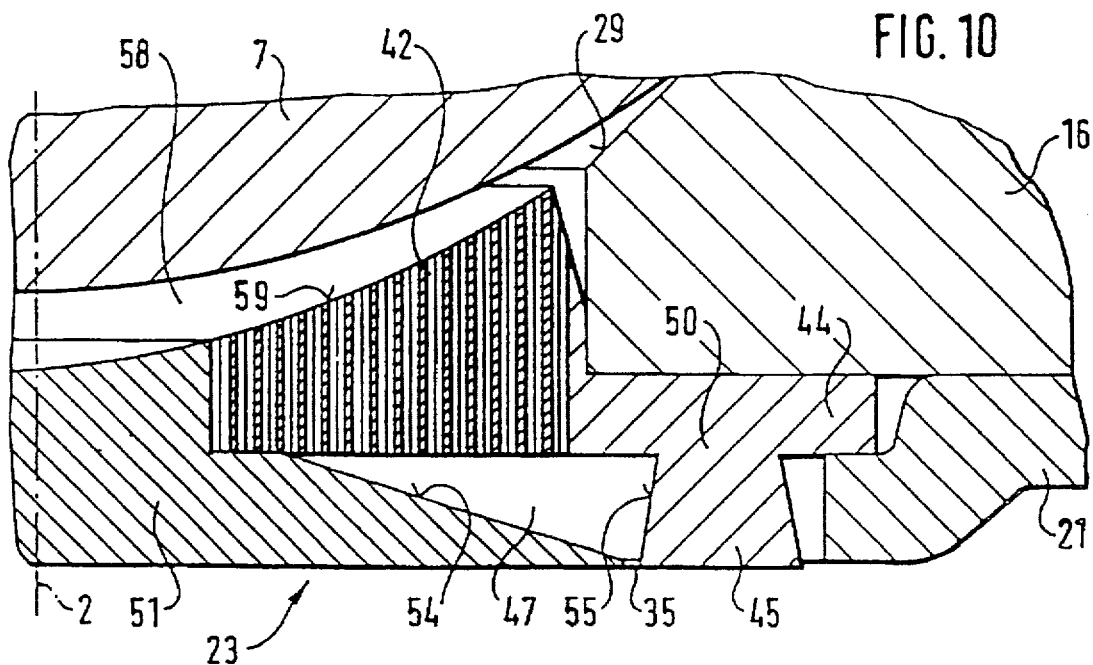
FIG. 10 a fifth exemplary embodiment of a partially shown nozzle plate in an axial section according to the present invention.

In FIG. 10, an exemplary embodiment of the nozzle plate 23 is shown partially having a contour which deviates from the level disk shape shown previously. The nozzle plate 23 differs from the other described forms in that the filter 42 does not have a constant extension in the axial direction. Instead, a filter surface 59 facing the valve-closure member 7 is designed with a depressed shape, whereas the filter 42 ends on its other side in a plane with the upper section 44. The depressed-shape filter surface 59 has, for example, a radius which corresponds more or less to the radius of the ball-shaped valve-closure member 7. Accordingly, a small space is obtained running almost parallel between the valve-closure member 7 and nozzle plate 23, which represents a so-called dead volume 58. The main idea behind the design of this exemplary embodiment of the present invention lies, namely, in reducing the dead volume 58 formed between the valve-closure member 7 and the nozzle plate 23 or rather the valve-seat member 16. As a result, the filter 42 can have on its axially thickest position near to the valve-seat member 16 dimensions which are more than twice as large as the actual disk-shaped upper section 44. The upper section 44 is designed with its outer region 50 and its inner region 51 in each case so that a direct transition from the filter surface 59 of the filter 42 is present, which, however, takes place to the outer region 50 at a sharp angle of, say, 90°.

The size of the dead volume 58 plays a decisive role in the problem of hot gasoline. A large dead volume 58 also always harbors a greater risk of the formation of vapor bubbles in the fuel, which is to be reduced with this arrangement according to the present invention. The approaching of the nozzle plate 23 to the valve-seat surface 29 while reducing the dead volume 58 also offers another advantage in that the flow of the fuel is settled downstream of the nozzle plate 23. The turbulence of the fuel can be considerably reduced with an appropriate configuration. The manufacture of such a nozzle plate 23 is hardly more difficult than for the already mentioned nozzle plates 23 since exactly the same tool can be used for manufacturing the lower section 45, and the upper section 44 with the filter 42 is no problem to manufacture today using known LIGA (Lithography, Galvanoshaping and Molding) technology.

Instead of a circular ring gap 35 (FIGS. 3, 6, 7, 10), a single elliptical ring gap 35 can also be provided in the nozzle plate 23. Flat jets with an oval cross-section can then be produced corresponding to the magnitude of the deviation from a circular shape.

Figure 11:
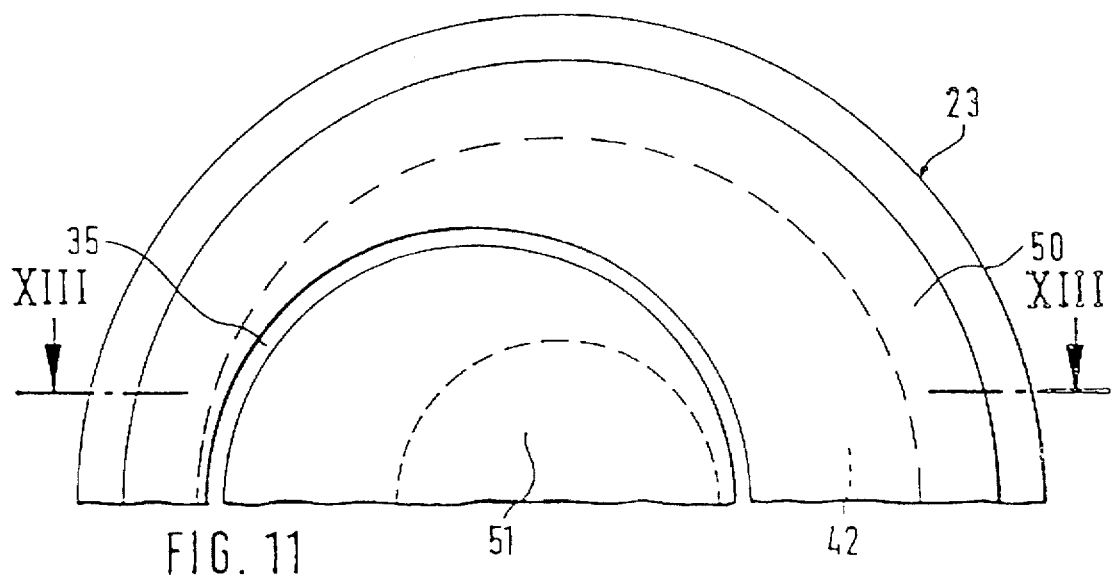
FIG. 11 a sixth exemplary embodiment of a nozzle plate according to the present invention in a partial bottom view.

In FIG. 11, a partial bottom view of another exemplary embodiment of a nozzle plate 23 according to the present invention is shown. This exemplary embodiment makes clear that the circular ring gap 35 does not have to be designed concentrically about the valve longitudinal axis 2. Instead, the ring gap 35 runs from the filter 42, in each case covered, both downstream of the inner edge of the filter 42 terminating the inner region 51 as well as also by 180° further downstream of the external edge of the filter 42 touching the outer region 50. Analogously, the ring gap 35 also travels over 180° once over the entire breadth (radial extension) of the ring chamber 47. The ring chamber 47 changes in the circumferential direction, namely, continuously its form so that, starting from a point at which the inner wall 54 is designed flat and the outer wall 55 steep, the ring gap 35 travels inwards in the direction of the valve longitudinal axis 2, such that the walls 54 and 55 soon also have the same inclination (at an angle of 90° from the starting point). After 180°, a reversal has occurred, i.e., the inner wall 54 is now steep and the outer wall 55 flat. Due to this design of the ring chamber 47 and the ring gap 35, a lamella 31 arises whose center axis does not extend perpendicular to the nozzle plate 23 or rather not parallel to the valve longitudinal axis 2. Instead, an inclined jet is produced. An inclined jet valve is useful when, due to structural reasons, an injection valve cannot be fitted into the induction pipe of an internal combustion engine with the necessary tilt. If the installation tilt cannot be adapted so that the valve longitudinal axis 2 is aimed in its extension at the intake valve, however, it is possible with such an inclined jet to directly hit the intake valve with an appropriate tilt.

Figure 12:
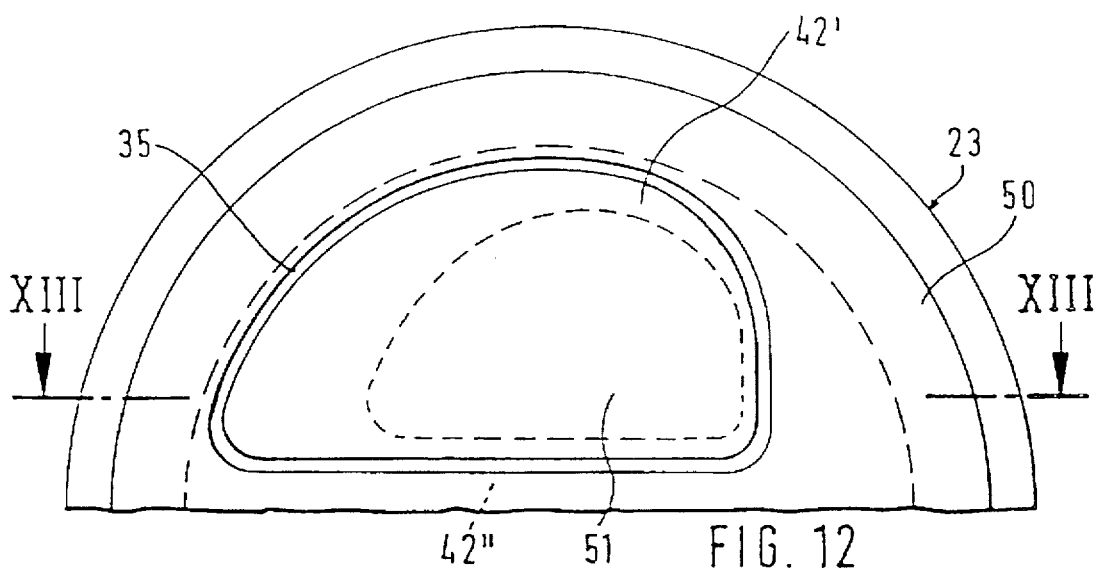
FIG. 12 a seventh exemplary embodiment of a nozzle plate according to the present invention in a partial bottom view.

The partial bottom view of another nozzle plate 23 shown in FIG. 12 represents a combination of the exemplary embodiments as shown in FIGS. 9 and 11. Accordingly, the nozzle plate 23 has two ring gaps 35 with a contour that deviates from a circular shape. Here as well, the ring chamber 47 is designed over its circumference with a variable structure so that the ring gap 35 again travels over the radial breadth of the filter 42 covering it. Since two inclined jets or rather lamellae 31 tilted against the valve longitudinal axis 2 are now formed downstream of the nozzle plate 23, this design is particularly well suited to ejection on two intake valves per cylinder of an internal combustion engine which cannot be otherwise directly aimed at due to unfavorable installation conditions.

Figure 13:
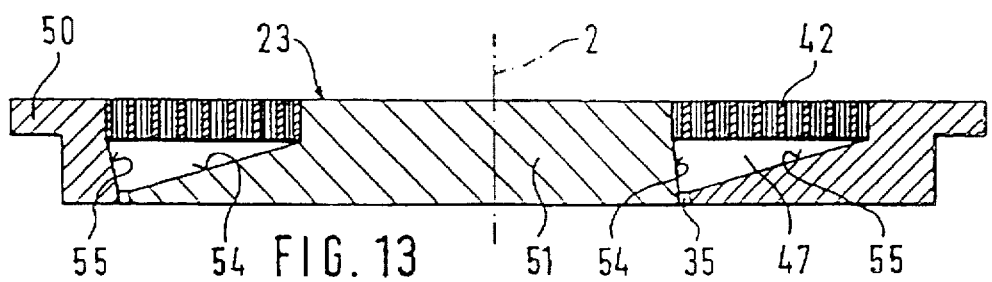
FIG. 13 shows a nozzle plane in an axial section along the lines XIII—XIII as shown in FIGS. 11 and 12.

FIG. 13 is a transverse representation along the lines XIII—XIII in the FIGS. 11 and 12, which once again illustrates the travel of the ring gap 35 with respect to the filter 42 and the reversal of the inclinations of the walls 54 and 55 of the ring chamber 47 by 180°.

Figure 14:
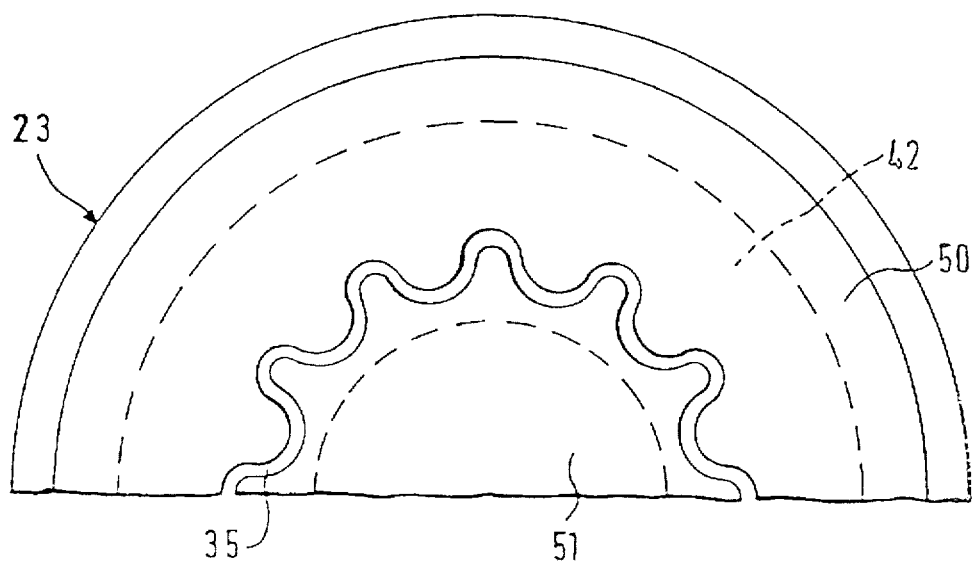
FIG. 14 shows an eighth exemplary embodiment of a nozzle plate according to the present invention in a partial bottom view.

Besides elliptical or circular ring gaps 35, entirely different, e.g., meandering ring gap patterns are also imaginable (FIG. 14). Here, however, the ring gaps 35 must in any case run uninterrupted and not have any "folds". i.e., 90° angles since otherwise the lamella 31 would split there.

In order to be able to produce a flat jet having a circular ring gap geometry, there exists the possibility of ring gap breadth variation b over the circumference of the ring gap 35. The outer diameter of the ring gap 35 is, for example, 35 constant so that the outer edge of the ring gap 35 extends circularly; on the other hand, the inner diameter is not constant so that the inner edge of the ring gap 35 has an elliptical shape, whereby the ring gap breadth b is variable. The reversal of the elliptical/circular form of the edges to the respective other state is likewise imaginable.

Using the FIGS. 16 to 32, the manufacturing process of the nozzle plate 23, and particularly that of the exemplary embodiment of the present invention shown in FIG. 3, is illustrated. Very demanding requirements are made of the quality of the nozzle plate 23 in order to produce the desired fuel lamellae 31, which in turn are a guarantee for the arisal of very small fuel droplets 38. Therefore, very smooth, burr-free surfaces are required in order to avoid flow turbulences. Moreover, the narrow ring gap 35 must conform to very tight tolerances in its ring gap breadth b. A deviation of 1 µm from a specified ring gap breadth b can already mean an approx. 3% flow rate deviation. In large part counts, the flow rate may be subject to only an extremely small variation. It should be possible to fulfill these stated requirements reproducibly for the purpose of cost-effective manufacture with large part counts, e.g., 100000 pieces/day.

So-called MIGA technology has proven particularly useful for such manufacturing. In a first process step (FIG. 16), an archetype 60 is produced as a negative form of the later lower section 45, e.g., in a thermoplastically deformable plastic (polymethyl methacrylate, PMMA for short, is particularly suitable), which archetype 60 already has very accurate contours, particularly with regard to the ring gap 35 as well as the inner and outer wall 54 and 55. As a manufacturing method for the archetype 60 in PMMA, diamond machine cutting as mechanical micromachining or rather ablation using excimer lasers are highly suitable due to the great precision. The archetype 60 is required for manufacturing a punch 61 (FIG. 18) which in turn is used in a later manufacturing step for producing the nozzle plate 23. The manufacture of the archetype 60 as a microstructured part having a thickness of, e.g., 350 µm, in other words a very thin film, and three-dimensional structures is comparably cost-intensive. Very high part counts are required for profitable production.

Accordingly, the archetype should be precisely machined so that the punch 61 molded on it can be used, for example at least ten thousand times with a constant quality.

Figure 16:
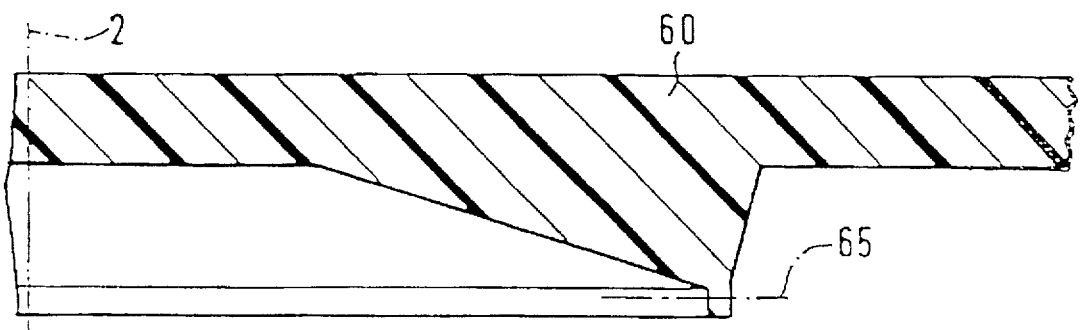
FIGS. 16–32 shows process steps for manufacturing the nozzle plate according to the present invention as shown in FIG. 3.

The excimer laser used, for example, to manufacture the archetype 60 is characterized by a very high power density and a short wavelength (typically λ=193 nm). The ablation, i.e., volume-wise removal of material in an explosive manner, is possible only due to the high power density of the laser. This entirely chip-free removal process is particularly suitable due to the extremely precise contours it yields. Instead of PMMA as the material for the archetype 60, copper beryllium CuBe2 can also be used as a material. In FIG. 16, an ejection plane 65 is drawn in with a dashed line which is intended to indicate that the region of the ring gap 35 is designed as a negative in the archetype 60 with a significantly increased height in order to guarantee simpler handling in subsequent process steps.

Figure 17:
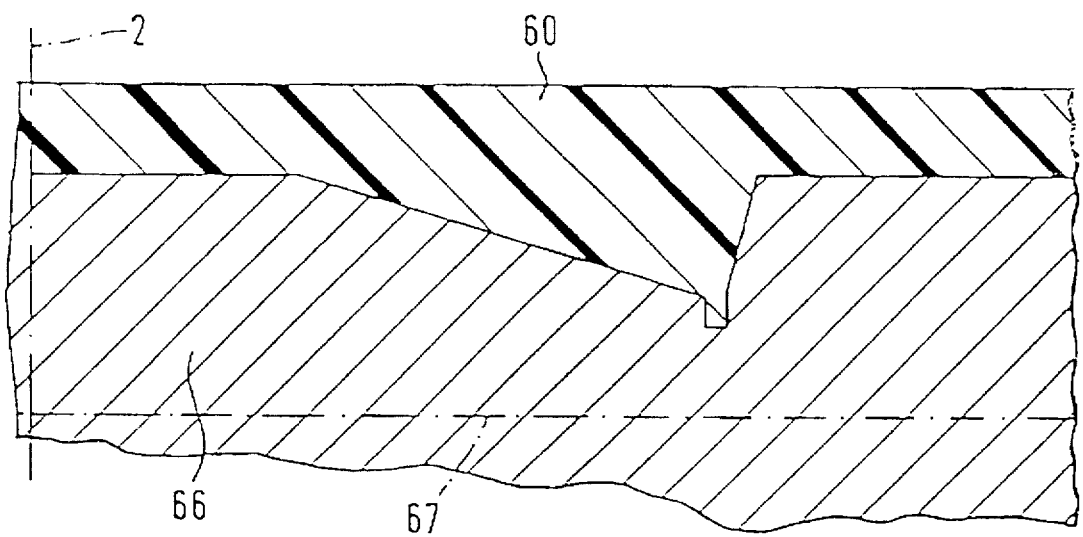
Figure 18:
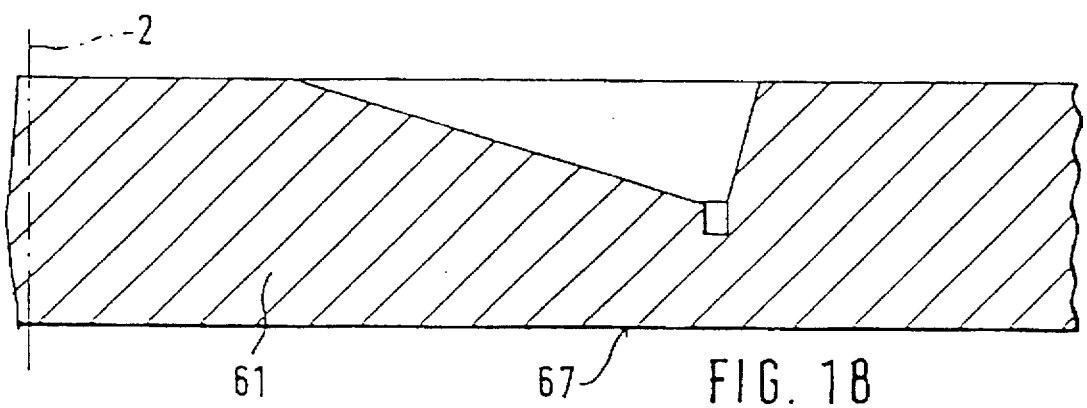

In a next process step illustrated in FIG. 17, a layer 66 is applied to the archetype 60 as a negative form in a galvanic bath. The layer 66 consists, for example, of nickel or nickel alloys, particularly of NiCo. Through the galvanic deposition of the layer 66, a surface relief is produced through the growth in thickness of the layer 66 which traces the contours of the archetype 60. The layer thickness of the layer 66 is equal to, for example, more than 200 µm at its thickest location. As a result of the electroplating, the layer 66 is positioned tightly against the archetype 60 so that the specified contours, particularly the ring chamber 47 and the ring gap 35, are reproduced true-to-form in it. A grinding line 67 shown in FIG. 17 indicates where the tool should be leveled in the form of the punch 61. The punch 61 is formed from the layer 66, namely, through appropriate machining, such as milling or grinding, along the grinding line 67. Moreover, this process step also contains the removal of the archetype 60 from the mold. FIG. 18 shows the punch 61 after the grinding and removal from the mold. When using PMMA for the archetype 60, ethyl acetate ($C_2H_5OCOCH_3$) is particularly useful for removal. Mechanical separation represents another possible means of removal. When using CuBe2 for the archetype 60, however, it is necessary to apply a metal layer (e.g., chromium) to the archetype 60 prior to electroplating (FIG. 17) in order to achieve a mechanical separation of the archetype 60 and punch 61 with accurate dimensions. The punch 61 manufactured according to these process steps and shown in FIG. 18 should now be suitable for use as a tool, as was already mentioned for example, at least ten thousand times. Since a multitude of archetypes 60 are simultaneously manufactured as microstructured parts (e.g., on a wafer-like panel), a multitude of punches 61 can also be manufactured simultaneously through the electroplating of the layer 66 and the subsequent removal from the mold, of which each one can be used very often in the above described form. The separation takes place using known techniques, e.g., precision sawing.

Figure 19:
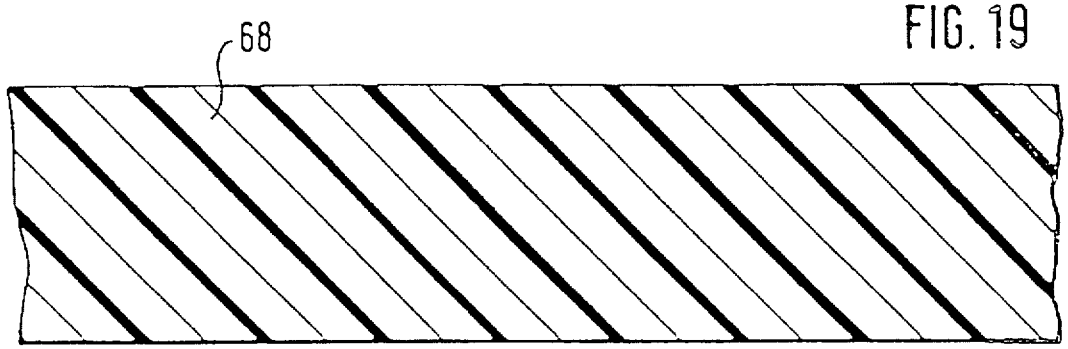
Figure 20:
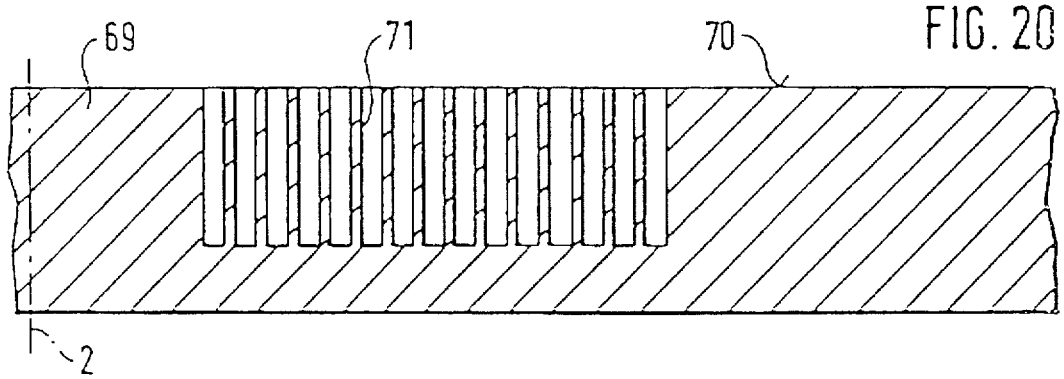

To manufacture the top section 44 of the nozzle plate 23, one begins with a normal plate 68 made of polymethyl methacrylate (PMMA) (FIG. 19). In FIG. 20, a punch tool 69 is shown which already has a structure 71 required for the filter 42, e.g., a honeycomb structure and which is manufactured using a known LIGA process. Here, for example, synchrotron radiation is generated in a generally known form. The synchrotron radiation is used according to the known LIGA technique according to which a plastic can be treated with the synchrotron radiation, subsequently exposed to light and developed so that the regions of the plastic which are not treated with synchrotron radiation are available as surface structures. The galvanoshaping and the removal from the mold must take place precisely so that the desired filter structures are exactly present and a tool side serving as the punch surface 70 of the punch tool which again consists, for example, of NiCo is exactly even.

Figure 21:
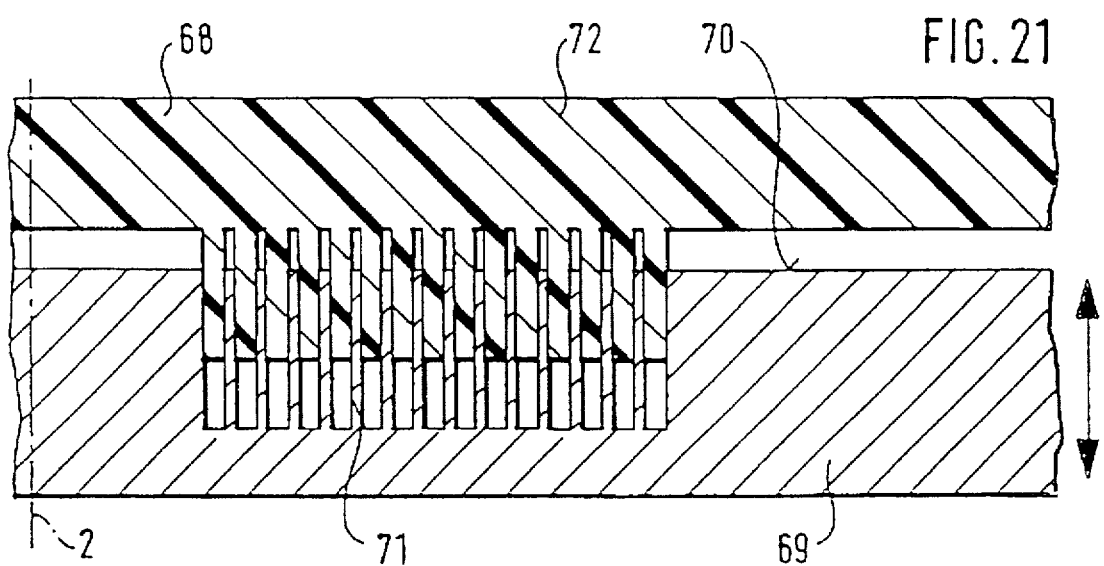
Figure 22:
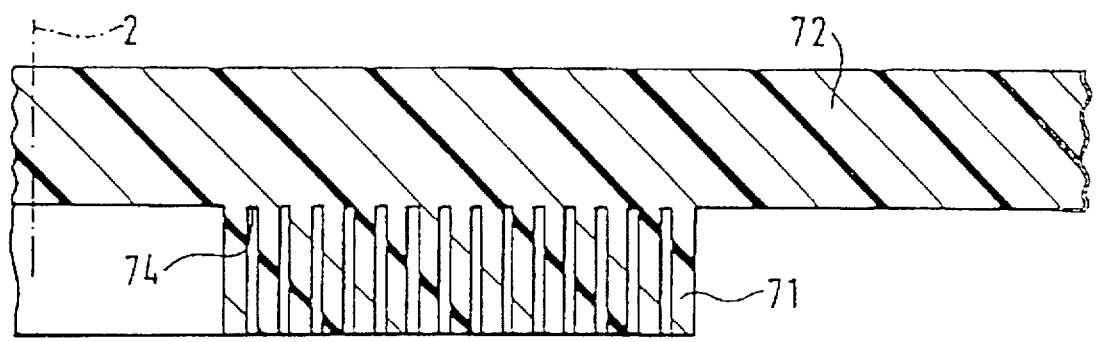

In a next process step, which is shown in FIG. 21, a galvanic mask 72 is produced, namely, through stamping, specifically, through the impression of the punch tool 69 with its level punch surface 70 and the filter structure 71 into the plate 68. The stamping takes place, for example, with a pressure of 100 to 300 bar and at a temperature of 130° C. to 170° C. Thus, a sufficiently high plasticity of the PMMA plate is provided in order to receive the structure of the punch tool 69 to be impressed. The ejection of the punch tool 69 is carried out, for example, at a temperature of 70° C. Following the stamping of the galvanic mask 72, a part exists as is shown in FIG. 22. In order to guarantee an electroplating on the galvanic mask 72 and a later removal of the newly grown part from the galvanic mask 72, it is necessary to metallize only base surfaces 74 of the filter structure 71 of the galvanic mask 72. This so-called initial metallization thus produces a metallic control surface which is required for the electroplating. However, the metallization cannot take place through sputtering since this would cause the filter structure 71 to build up due to the metal atoms being deposited on the side faces of the filter structure 71.

Figure 23:
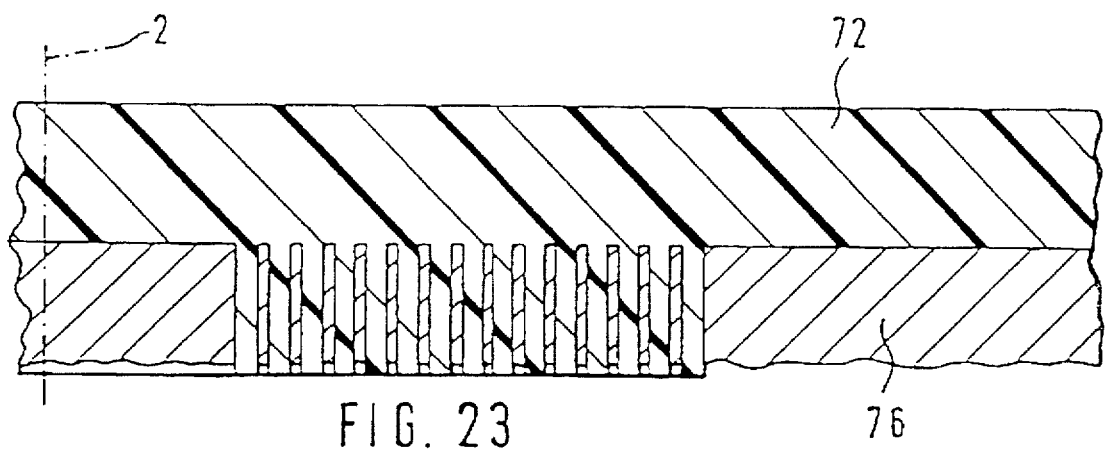
Figure 24:
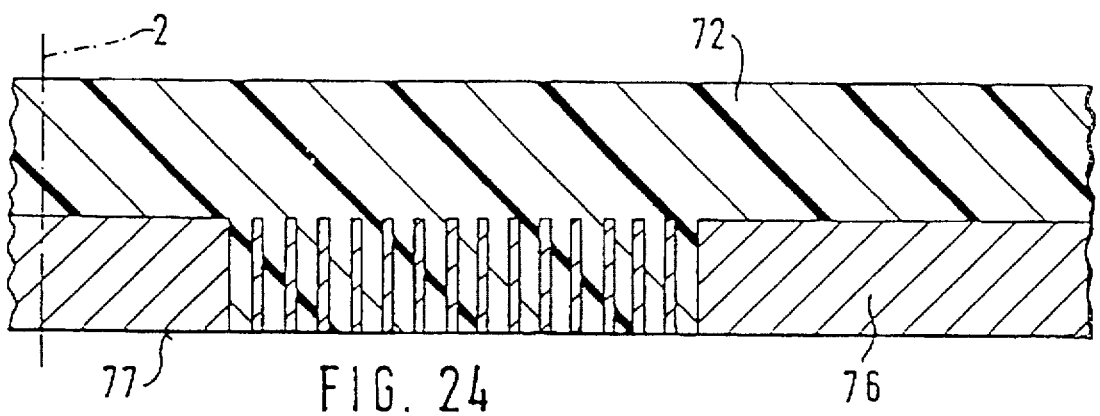

In a following process step, as shown by FIG. 23, the galvanic mask 72 provided with an initial metallization on the base surfaces 74 is electroplated in a galvanic bath with, for example, copper, nickel or a nickel alloy, particularly with NiCo on the side of the filter structure 71. Here, likewise, as was already mentioned in the manufacture of the punch 61, a layer 76 which later yields the upper section 44 of the nozzle plate 23 is produced through (isotropic) growth of the galvanic layer on the galvanic mask 72. The layer 76 produced in this manner has a true-to-form representation of the filter structure 71 which is important to the nozzle plate 23. The layer 76 can now be planarized through subsequent milling or grinding along a grinding line 77 (FIG. 24) so that any irregularities occurring during the electroplating can be eliminated. However, this planarization is only an option.

Figure 25:
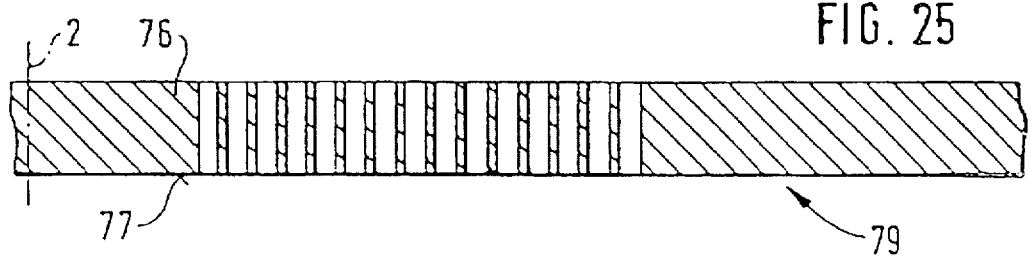
Figure 26:
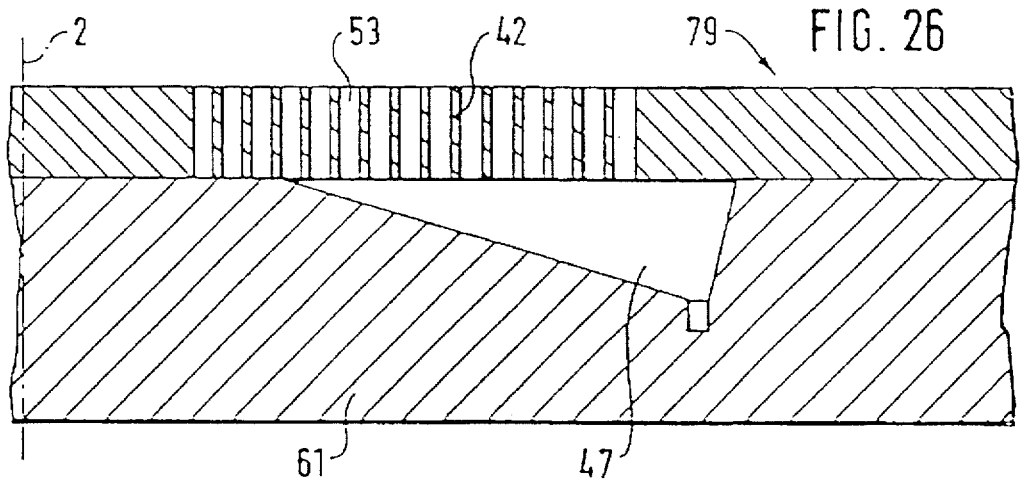
Figure 27:
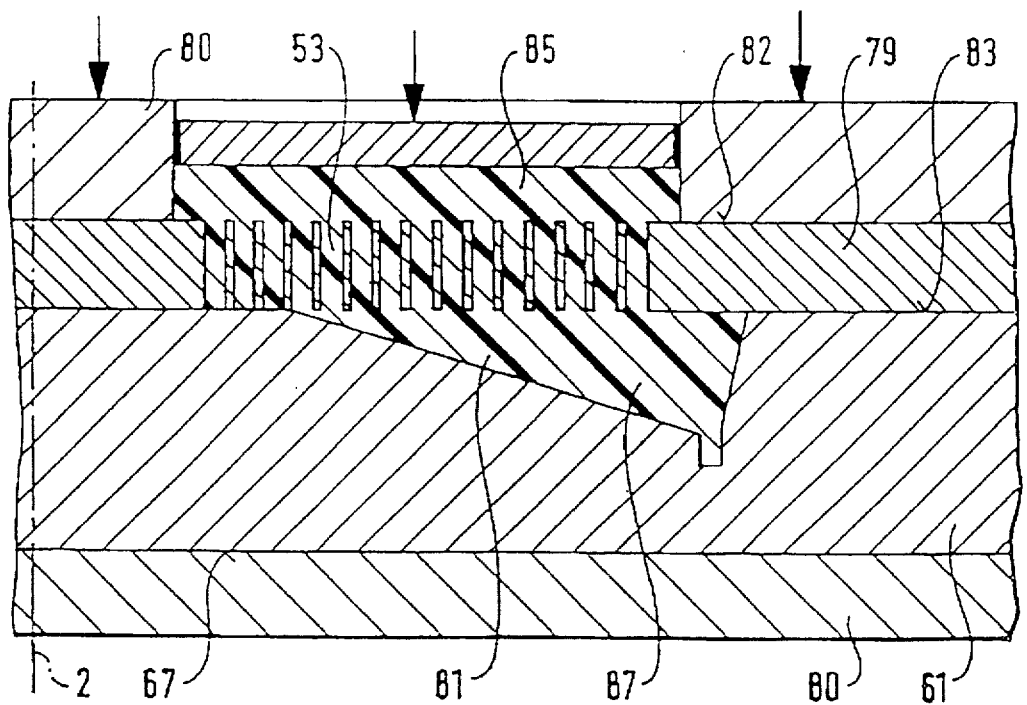

Afterwards, the galvanic mask 72 made of PMMA as a carrier is removed from the layer 76 so that this layer 76 now exists individually as a thin film (FIG. 25). As was already mentioned, this removal can take place through the use of ethyl acetate for removing the galvanic mask 72 or with mechanical separation processes. Subsequently, as shown in FIG. 26, the part now designated as filter film 79 but basically representing the layer 76 and later the upper section 44 is aligned on the punch 61 prepared according to FIG. 18. This must take place so precisely that the filter 42 and the ring chamber 47 already assume their desired, precisely defined position with respect to one another. Evacuation of the formed cavity 81 (FIG. 27) takes place immediately after this procedure. The main reason for removing the air from the cavity 81 is to prevent air bubbles from arising during the subsequent injection molding in the cavity 81 consisting of the ring chamber 47 and pores 53.

The evacuated part consisting of the filter film 79 and punch 61 is already present in a tool 80 which completely clamps this part both from the grinding line 67 as well as from a side 82 lying opposite the grinding line 77 of the filter film 79. With a pressure of, e.g., 300 bar, the filter film 79 and the punch 61 are pressed together with the tool 80 so that it is guaranteed that no injection molding material can reach the contact surface 83 between the filter film 79 and punch 61.

The injection molding takes place from the side of the filter film 79. For example, with a transfer press as tool 80, liquid PMMA at 160° C. is injected into the cavity 81 via the pores 53, i.e., through the filter 42. The injection continues until the entire cavity 81 is completely filled with PMMA. Moreover, an injection plate 85 resulting from the shape of the tool 80 remains standing on the side 82 of the filter film 79 above the filter 42.

Figure 28:
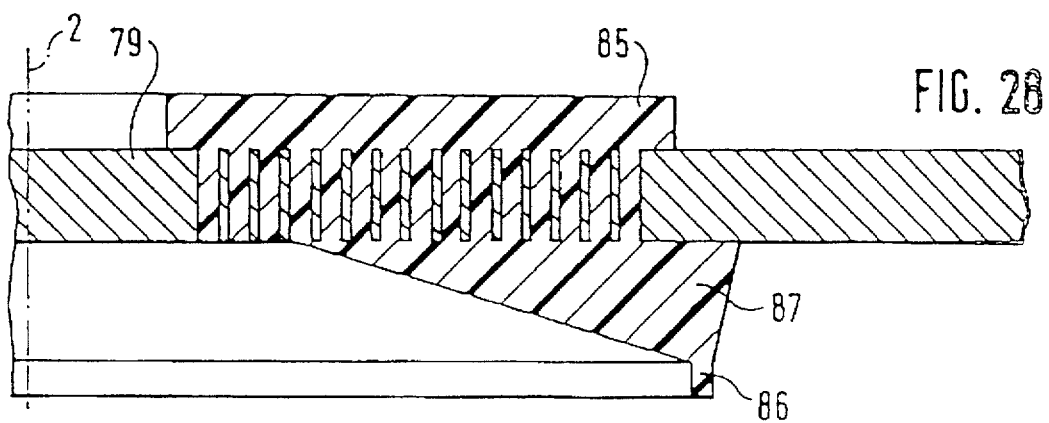
Figure 29:
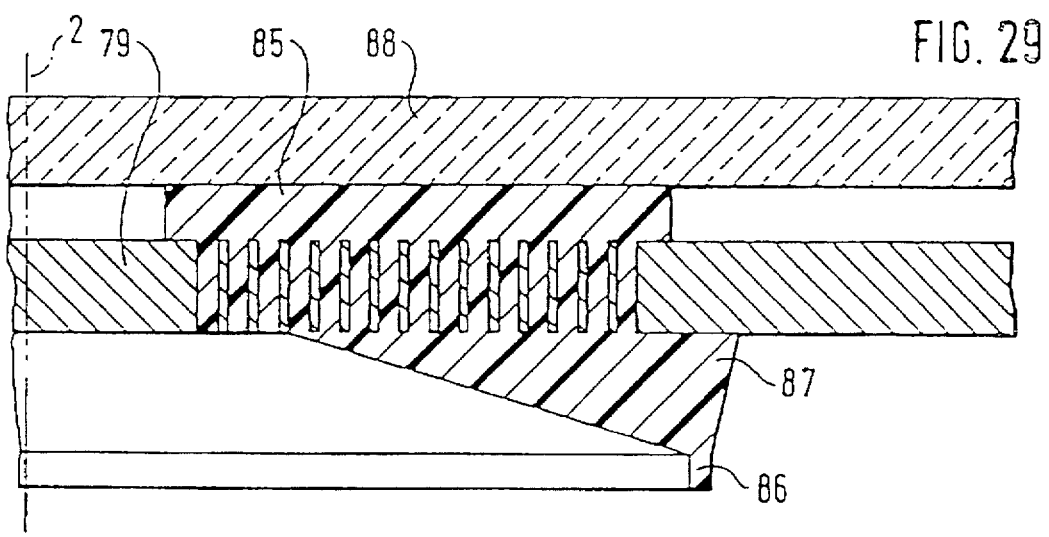

After the PMMA in the cavity 81 has cooled to below, e.g., 70° C., the tool 80 is first removed. Moreover, it is now very easy to remove the punch 61, which can often be reused. In FIG. 28, the remaining part consisting of the injection plate 85, filter film 79 with PMMA-filled pores 53 as well as a negative part 87 having the shape of the ring chamber 47 and the ring gap 35 (including an injection lip 86) made of PMMA is shown after removal from the tool 80 and the punch 61. The injection lip 86 as a negative now already has a breadth which corresponds exactly to the later ring gap breadth b, e.g., 35 µm or 50 µm. FIG. 29 shows an arrangement in which the part just described with its injection plate 85 is fastened to a carrier plate 88. The carrier plate 88 made of, say, glass or metal is needed during the subsequent grinding to make it possible to handle the very thin part at all.

Figure 30:
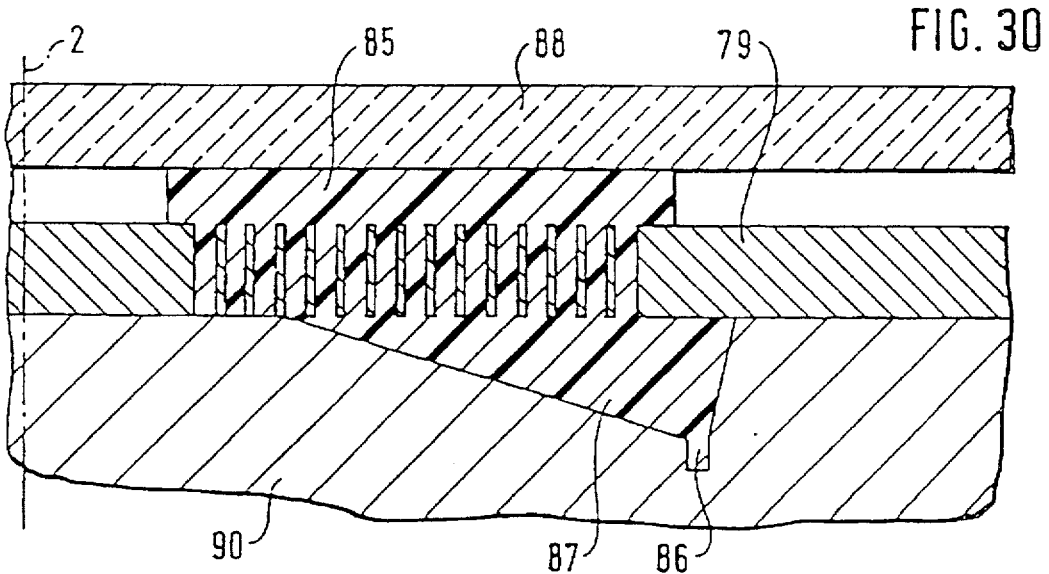
Figure 31:
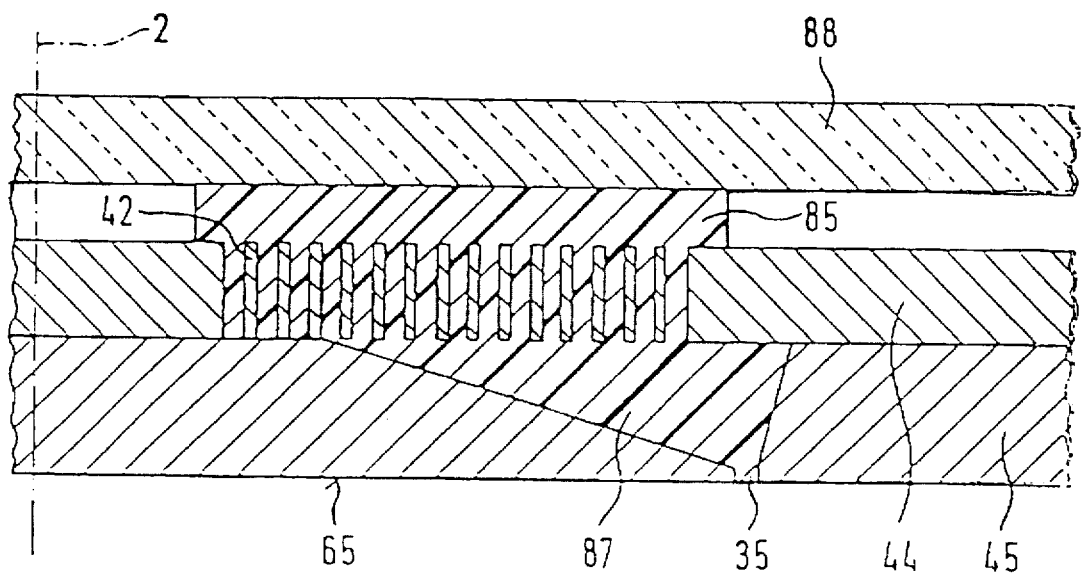
Figure 32:
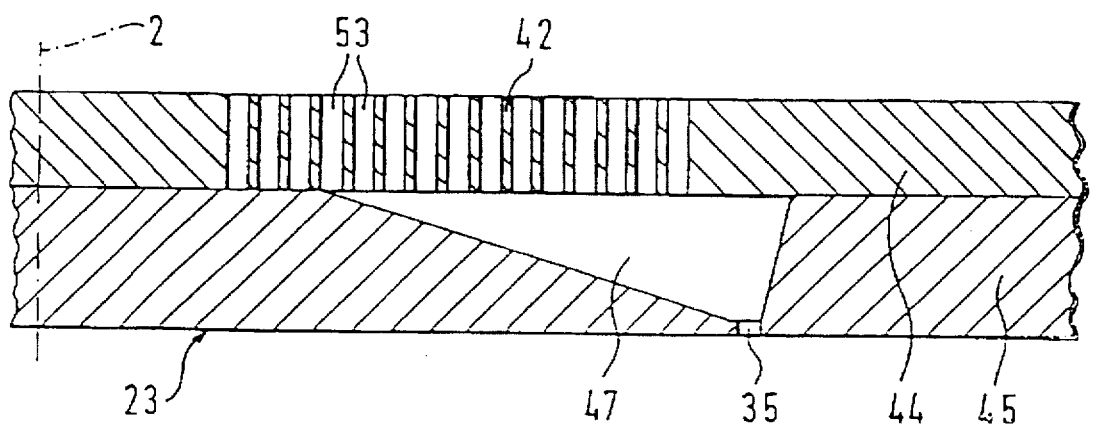

FIG. 30 shows that an additional electroplating about the negative part 87 with the injection lip 86 must take place in order to now finally shape the lower section 45. In other words, in this process step the negative part 87 is enveloped in a galvanic bath with, for example, copper, nickel or a nickel alloy, particularly with NiCo. Through growth of the galvanic layer on the filter film 79 around the negative part 87, a layer 90 yielding the later lower section 45 is now produced, which layer 90 is firmly joined to the filter film 79. The layer 90 in turn exhibits a true-to-form representation of the negative part 87. Along the ejection plane 65 already shown in FIG. 16, the layer 90 is subsequently planarized through milling or grinding. The upper section 44 and the lower section 45 now exist for the first time contiguously in the shape of the desired nozzle plate 23, the ring gap 35 also having for the first time through the grinding its predetermined ring gap height h (FIG. 31). In a last process step shown in FIG. 32, the PMMA found in the cavity 81 is dissolved and the injection plate 85 removed. This procedure takes place as before, for example, using ethyl acetate. The carrier plate 88 is automatically separated from the nozzle plate 23, which can be mounted in this form on an injection valve, as is partially shown in FIG. 1.

Using the described process steps, it is possible to manufacture nozzle plates 23 from two parts, namely, the filter film 79 and the layer 90, which represent in the end the sections 44 and 45. Through the consistent use of molding technology, cost-effective mass production becomes possible if the punch tool 69 is manufactured using highly precise and relatively expensive LIGA technology and the punch 61 is manufactured by producing the cost-intensive microstructured archetype 60. With micromechanical precision, namely, molding with tolerances of only approx. 1 μm is possible. The punch 61 has such quality that it can be used more than ten thousand times with a ring gap breadth b which remains constant, i.e., it has a very high reproducibility. Through the simultaneous manufacture of a multitude of punches 61 and the resulting simultaneous molding of a multitude of nozzle plates 23, the manufacturing process can be carried out with great effectiveness.

We claim:

1. A nozzle plate including a passage for providing a fluid, the nozzle plate comprising:
   a filter; and
   a ring chamber positioned substantially above a continuous ring gap,
   wherein the passage is formed by at least the filter, the ring chamber and the continuous ring gap.

2. The nozzle plate according to claim 1, further comprising an upper section and a lower section, wherein the lower section immediately follows the upper section in a flow direction of the fluid, the upper section including the filter, the lower section including the ring chamber and the continuous ring gap.

3. The nozzle plate according to claim 1, further comprising at least one inner circular inner region, wherein the filter has an annular design and is completely surrounded by an outside region, and the filter being externally surrounded by the outer region in a circumferential direction, the filter enclosing the at least inner circular inner region.

4. The nozzle plate according to claim 1, further comprising at least one inner circular inner region, and wherein the filter is formed from contiguous filter regions, the at least one circular inner region provided between contiguous filter regions, the filter being externally surrounded by an outer region, the filter being externally surrounded in a circumferential direction.

5. The nozzle plate according to claim 1, wherein the filter is an element having a plurality of pores, one of the plurality of pores being separated from another one of the plurality of pores with thin segments.

6. The nozzle plate according to claim 5, wherein the plurality of pores have honeycomb shape and a hexagonal cross-section.

7. The nozzle plate according to claim 1, further comprising an upper section, wherein the filter includes a plurality of pores, each of the plurality of pores having a length corresponding to a thickness of the upper section.

8. The nozzle plate according to claim 1, wherein the filter has a fixed axial thickness.

9. The nozzle plate according to claim 1, wherein the filter has a variable axial thickness.

10. The nozzle plate according to claim 1, further comprising a vertically axial extension, and wherein the ring chamber is radially defined by a plurality of walls, the plurality of walls forming an angle with the vertically axial extension for generating a radial component.

11. The nozzle plate according to claim 10, wherein the plurality of walls include an inner wall facing a nozzle plate center and an outer wall extending in different tilt directions.

12. The nozzle plate according to claim 10, wherein the plurality of walls include an inner wall facing a nozzle plate center and an outer wall extending in the constant tilt direction, the outer wall extending at varying tilt angles.

13. The nozzle plate according to claim 11, wherein the inner wall extends at a small angle relative to an X-axis, the radial component of the inner wall being greater than the radial component of the outer wall.

14. The nozzle plate according to claim 2, wherein the ring chamber is radially defined by a plurality of walls, the plurality of walls including an inner wall, and wherein the inner wall is positioned at least partially downstream from the filter to deflect the fluid streaming through the filter, the fluid being deflected when the inner wall is stricken.

15. The nozzle plate according to claim 10, wherein the plurality of walls includes a flat inner wall, the flat inner wall being formed at least partially by a level horizontal impact surface.

16. The nozzle plate according to claim 2, further comprising a plurality of walls, wherein the plurality of walls include a steep outer wall, the steep outer wall not being arranged directly downstream from the filter and having a radial offset.

17. The nozzle plate according to claim 10, wherein the plurality of walls diverge in a downward flow direction to the continuous ring gap.

18. The nozzle plate according to claim 17, wherein the continuous ring gap includes edges extending vertically from the plurality of walls.

19. The nozzle plate according to claim 1, wherein the continuous ring gap divides the nozzle plate to form an inner region and an outer region, the inner region including an inner downstream limiting surface, the outer region including a outer downstream limiting surface lying at least near the continuous ring gap, the outer downstream limiting surface having an axial spacing.

20. The nozzle plate according to claim 18, wherein the axial spacing between the inner and outer downstream limiting surfaces is substantially similar to a height of a vertical edge of the continuous ring gap.

21. The nozzle plate according to claim 19, wherein the axial spacing between the inner and outer downstream limiting surfaces is greater than a height of a vertical edge of the continuous ring gap due to an additional axial offset.

22. The nozzle plate according to claim 4, wherein the continuous ring gap includes two ring gaps, each one of two ring gap is independent of another one of the two ring gaps, each of the two ring gaps being coupled to the contiguous filter regions.

23. The nozzle plate according to claim 1, wherein the contiguous ring gap has a circular shape.

24. The nozzle plate according to claim 1, wherein the contiguous ring gap has a non-circular shape.

25. The nozzle plate according to claim 1, wherein the contiguous ring gap has a constant ring gap breadth.

26. The nozzle plate according to claim 1, wherein the contiguous ring gap has an axial ring gap height and a ring gap breadth, the axial ring gap height being smaller than the ring gap breadth.

27. The nozzle plate according to claim 25, wherein the ring gap breadth of the continuous ring gap is between 25 μm and 50 μm.

28. The nozzle plate according to claim 26, wherein the ring gap breadth of the continuous ring gap is between 25 μm and 50 μm.

29. A method for manufacturing a nozzle plate, the nozzle plate including a passage for providing a fluid, the method comprising the steps of:
   providing a filter; a ring chamber, a continuous ring gap, an upper section and a lower section;

arranging the ring chamber above the continuous ring gap; and forming the passage with at least the filter, the ring chamber and the continuous ring gap, wherein the upper and lower sections are manufactured through a combination of a MIGA technology and a LIGA technology.

30. The method according to claim 29, further comprising the step of:

generating an archetype for manufacturing a punch, the punch being used for manufacturing the lower section, the archetype being generated using a microstructuring method.

31. The method according to claim 30, wherein the archetype is generated using a diamond machine cutting method.

32. The method according to claim 30, wherein the archetype is generated using an ablation method with an excimer laser.

33. The method according to claim 29, further comprising the steps of:

shaping a punch tool using the LIGA technology, the punch tool being used for manufacturing the upper section of the nozzle plate and the filter;

stamping the punch tool into a thin plate, the punch tool being stamped as a negative part in the thin plate;

removing the punch tool to form a galvanic mask from the thin plate;

providing the galvanic mask with at least a partial metallization;

electroplating the at least partially metallized galvanic mask to form a first layer; and removing the galvanic mask from the layer, wherein the first layer is a filter film.

34. The method according to claim 33, further comprising the steps of:

generating an archetype for manufacturing a punch, the punch being used for manufacturing of lower section;

aligning the filter film;

placing the film filter on the punch;

forming a cavity inside the punch and the filter film;

arranging the filter film and the punch in a tool;

removing air from the cavity;

filling the cavity using an injection molding method, the injection molding method producing the negative part in the cavity, the negative part forming a contour of the ring chamber and the contiguous ring gap;

removing the punch tool;

removing the punch from the filter film and the negative part;

applying a second layer on the negative part, the second layer being electroplated, the second layer being the lower section of the nozzle plate;

grinding the second layer; and removing the negative part from the nozzle plate.

35. The method according to claim 33, wherein the at least partially metallized galvanic mask is electroplated with NiCo.

36. The method according to claim 34, wherein the second layer is electroplated with NiCo.

37. The method according to claim 30, wherein the archetype has a polymethyl methacrylate (PMMA) composition.

38. The method according to claim 33, wherein the plate and the galvanic mask each have a polymethyl methacrylate (PMMA) composition.

39. The method according to claim 34, wherein the negative part has a polymethyl methacrylate (PMMA) composition.

40. The method according to claim 39, wherein the PMMA is dissolved with an ethyl acetate compound.

* * * * *

UNITED STATES PATENT AND TRADEMARK OFFICE
CERTIFICATE OF CORRECTION

PATENT NO. : 5,730,368
DATED : Mar. 24, 1998
INVENTOR(S) : Flik et al.

It is certified that error appears in the above-identified patent and that said Letters Patent is hereby corrected as shown below:

In the Title, change "PROCESSES" to --PROCESS--.

Column 1, line 2, change "PROCESSES" to --PROCESS--.

Column 1, line 52, delete "i.e."

Column 5, line 24, change "this" to --the--.

Column 5, line 45, after "that" insert --,--.

Column 14, line 21, after "example" insert --,--.

Column 18, line 34, change "18," to --19,--.

Signed and Sealed this

Twelfth Day of January, 1999

Attest:

Attesting Officer

*Acting Commissioner of Patents and Trademarks*